US012568299B2

(12) United States Patent
Misawa

(10) Patent No.: US 12,568,299 B2
(45) Date of Patent: Mar. 3, 2026

(54) GUI SETTING APPARATUS, GUI SETTING METHOD, AND GUI SETTING PROGRAM

(71) Applicant: FUJIFILM Corporation, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

(21) Appl. No.: 18/313,976

(22) Filed: May 8, 2023

(65) Prior Publication Data

US 2023/0276118 A1 Aug. 31, 2023

Related U.S. Application Data

(63) Continuation of application No. PCT/JP2021/037303, filed on Oct. 8, 2021.

(30) Foreign Application Priority Data

Nov. 18, 2020 (JP) ................................. 2020-191913

(51) Int. Cl.
H04N 23/62 (2023.01)
G06F 3/04847 (2022.01)
G06F 8/38 (2018.01)

(52) U.S. Cl.
CPC ......... H04N 23/62 (2023.01); G06F 3/04847 (2013.01); G06F 8/38 (2013.01)

(58) Field of Classification Search
CPC .. H04N 23/62; H04N 23/631; G06F 3/04847; G06F 3/04883; G06F 8/38; G06F 9/451
USPC .................. 345/661; 715/762, 764, 765, 779
See application file for complete search history.

(56) References Cited

U.S. PATENT DOCUMENTS

| | | | | | |
|---|---|---|---|---|---|
| 5,475,843 A | * | 12/1995 | Halviatti | ............. | G06F 9/45512 |
| | | | | | 719/329 |
| 6,850,282 B1 | * | 2/2005 | Makino | .................. | H04N 23/74 |
| | | | | | 348/370 |
| 10,505,755 B2 | * | 12/2019 | Ha | ....................... | H04L 12/2821 |
| 2005/0235207 A1 | * | 10/2005 | Albrecht | ............... | G06F 3/0481 |
| | | | | | 715/779 |

(Continued)

FOREIGN PATENT DOCUMENTS

| | | |
|---|---|---|
| JP | 2004-341813 A | 12/2004 |
| JP | 2013-182463 A | 9/2013 |

(Continued)

OTHER PUBLICATIONS

Nakayama Junya, Portable Terminal Device, Touch Operation Control Method, and Program, Sep. 12, 2013, NEC Casio Mobile COMM LTD, JP2013182463 (A), paras. 21-36, 44, Figs. 3-5, English.*

(Continued)

*Primary Examiner* — Prabodh M Dharia

(74) *Attorney, Agent, or Firm* — Studebaker Brackett PLLC

(57) ABSTRACT

Provided are a GUI setting apparatus, a GUI setting method, and a GUI setting program capable of easily customizing a GUI for each user. A processor of a GUI setting apparatus is configured to execute evaluation value acquisition processing of acquiring an evaluation value for evaluating an operational feeling of a user with respect to a GUI for operating an electronic apparatus, and GUI setting processing of setting the GUI based on the evaluation value.

23 Claims, 31 Drawing Sheets

(56) References Cited

U.S. PATENT DOCUMENTS

| | | | |
|---|---|---|---|
| 2006/0181681 A1* | 8/2006 | Katsumata | G03B 33/04 |
| | | | 352/53 |
| 2009/0228813 A1* | 9/2009 | Sekiguchi | G16Z 99/00 |
| | | | 715/764 |
| 2011/0202855 A1* | 8/2011 | Ikegami | G06F 11/3688 |
| | | | 715/762 |
| 2014/0195940 A1* | 7/2014 | Ogiso | G06F 3/04886 |
| | | | 715/765 |
| 2017/0242852 A1* | 8/2017 | Clain | G06F 40/174 |
| 2018/0157372 A1 | 6/2018 | Kurabayashi | |
| 2018/0182114 A1* | 6/2018 | Hanamoto | G06T 3/04 |
| 2019/0197666 A1* | 6/2019 | Oikkonen | G06T 3/12 |
| 2019/0356792 A1* | 11/2019 | Kuwabara | H04N 1/00172 |
| 2020/0003835 A1* | 1/2020 | Ahmad | G01R 31/31907 |
| 2021/0287460 A1* | 9/2021 | Aono | G07C 5/008 |

FOREIGN PATENT DOCUMENTS

| | | |
|---|---|---|
| JP | 2014-137723 A | 7/2014 |
| JP | 2016-134694 A | 7/2016 |
| JP | 2017-033451 A | 2/2017 |

OTHER PUBLICATIONS

Nakayama Junya, Portable Terminal Device, Touch Operation Control Method, and Program, Sep. 12, 2013, NEC Casio Mobile COMM LTD, JP2013182463 (A), paras. 21-36, 44, Figs. 3-5, Japanese.*

Hasegawa Yoichi, Transaction Processing Device and Transaction Processing Method, Jul. 28, 2014, Hitachi Omron Terminal Solutions CORP, JP2014137723 (A), paras. 9-57, Figs. 1-13 English.*

Hasegawa Yoichi, Transaction Processing Device and Transaction Processing Method, Jul. 28, 2014, Hitachi Omron Terminal Solutions CORP, JP2014137723 (A), paras. 9-57, Figs. 1-13 Japanese.*

International Search Report issued in PCT/JP2021/037303; mailed Dec. 21, 2021.

Written Opinion of the International Searching Authority issued in PCT/JP2021/037303; mailed Dec. 21, 2021.

Written Opinion of the International Preliminary Examining Authority issued in PCT/JP2021/037303, mailed Nov. 22, 2022.

"Notice of Reasons for Refusal" Office Action issued in JP 2022-563622; mailed by the Japanese Patent Office on Apr. 8, 2025.

* cited by examiner

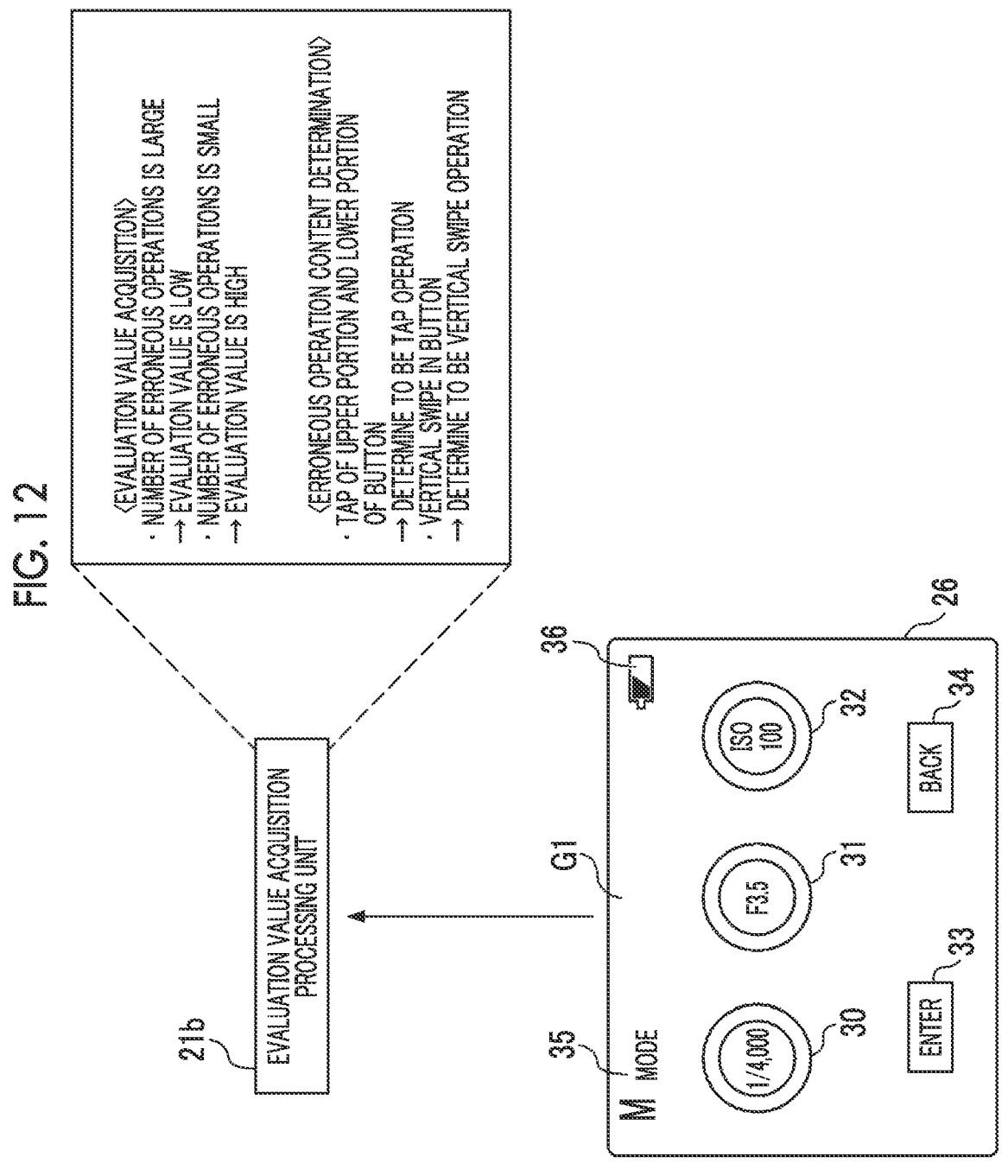

<EVALUATION VALUE ACQUISITION>
・NUMBER OF ERRONEOUS OPERATIONS IS LARGE
→ EVALUATION VALUE IS LOW
・NUMBER OF ERRONEOUS OPERATIONS IS SMALL
→ EVALUATION VALUE IS HIGH

<ERRONEOUS OPERATION CONTENT DETERMINATION>
・TAP OF UPPER PORTION AND LOWER PORTION
OF BUTTON
→ DETERMINE TO BE TAP OPERATION
・VERTICAL SWIPE IN BUTTON
→ DETERMINE TO BE VERTICAL SWIPE OPERATION

21b

EVALUATION VALUE ACQUISITION
PROCESSING UNIT

<WHOLE IS S16>

FIG. 18

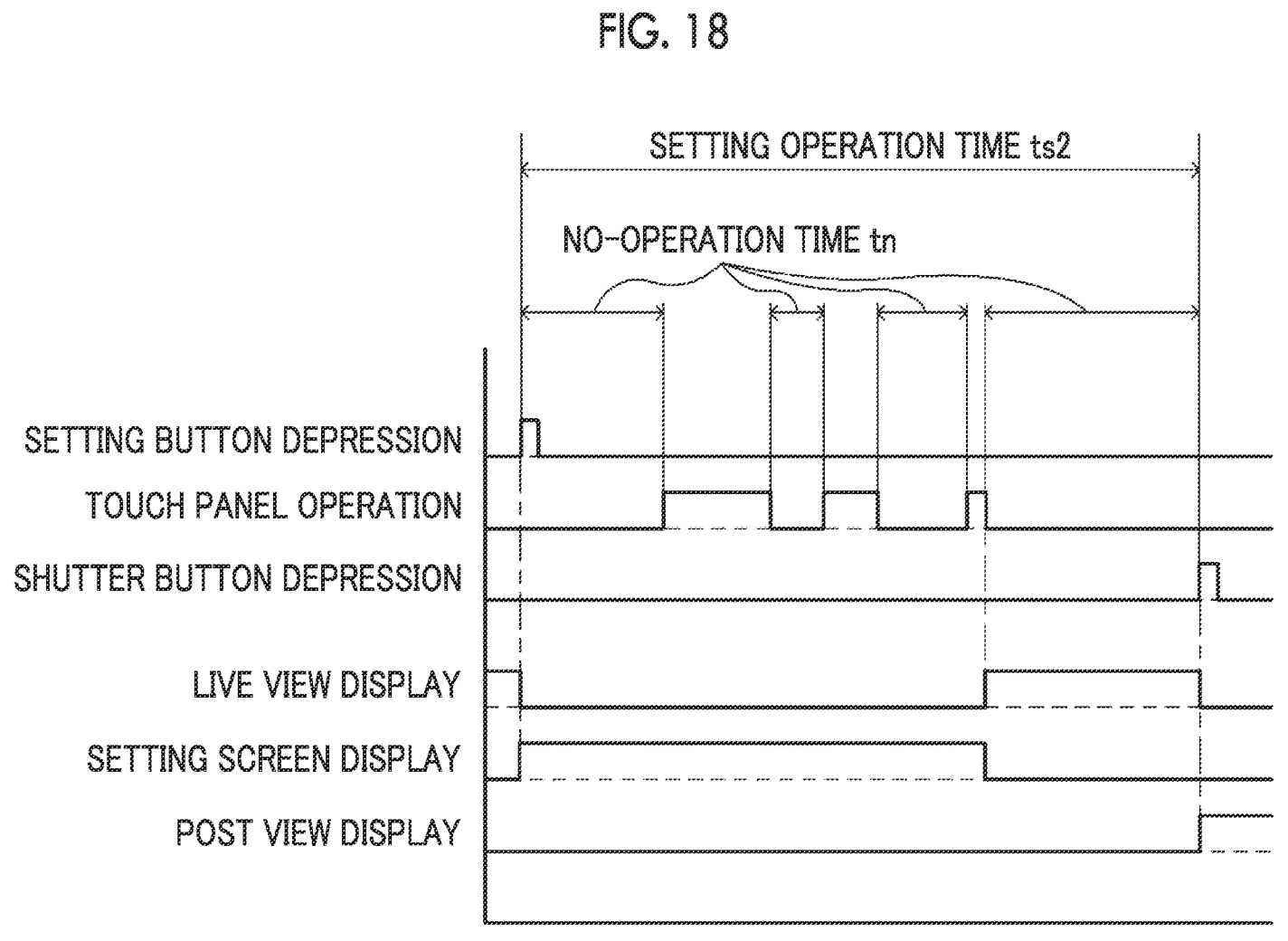

SETTING OPERATION TIME ts2

NO-OPERATION TIME tn

SETTING BUTTON DEPRESSION

TOUCH PANEL OPERATION

SHUTTER BUTTON DEPRESSION

LIVE VIEW DISPLAY

SETTING SCREEN DISPLAY

POST VIEW DISPLAY

<WHOLE IS SA16>

〈WHOLE IS SA161〉

| OPERATION ITEM | CUMULATIVE NUMBER OF SETTINGS |
|---|---|
| SHUTTER SPEED | 112 TIMES |
| STOP | 68 TIMES |
| IMAGING SENSITIVITY | 35 TIMES |

<WHOLE IS SB161>

START

SB1610
DETERMINE CHANGE PORTION AND CHANGE DEGREE BASED ON OPERATION HISTORY

SB1611
IS TOTAL OF DEVIATION AMOUNT EQUAL TO OR LESS THAN THRESHOLD VALUE?

No

SB1613
DECREASE CHANGE DEGREE

Yes
SB1612
GENERATE GUI

END

FIG. 24

| PRIORITY | CHANGE ELEMENT | CHANGE DEGREE | DEVIATION AMOUNT |
|---|---|---|---|
| 1 | BUTTON SIZE | 1.3 TIMES | 3 |
| | | 1.2 TIMES | 2 |
| | | 1.1 TIMES | 1 |
| | | STANDARD | 0 |
| | | 0.9 TIMES | 1 |
| | | 0.8 TIMES | 2 |
| | | 0.7 TIMES | 3 |
| 2 | BUTTON DISPLAY CHROMA SATURATION | ULTRAHIGH | 2 |
| | | HIGH | 1 |
| | | STANDARD | 0 |
| | | LOW | 1 |
| | | ULTRALOW | 2 |
| 3 | SWIPE OPERATION REACTION AMOUNT | 1.3 TIMES | 3 |
| | | 1.2 TIMES | 2 |
| | | 1.1 TIMES | 1 |
| | | STANDARD | 0 |
| | | 0.9 TIMES | 1 |
| | | 0.8 TIMES | 2 |
| | | 0.7 TIMES | 3 |
| 3 | TAP OPERATION IDENTIFICATION TIME | 1.3 TIMES | 3 |
| | | 1.2 TIMES | 2 |
| | | 1.1 TIMES | 1 |
| | | STANDARD | 0 |
| | | 0.9 TIMES | 1 |
| | | 0.8 TIMES | 2 |
| | | 0.7 TIMES | 3 |
| 4 | DETECTION REGION DISPLACEMENT AMOUNT | 60 PIXELS | 3 |
| | | 40 PIXELS | 2 |
| | | 20 PIXELS | 1 |
| | | STANDARD | 0 |

FIG. 32

| CAMERA ID | OPERATION TYPE SCREEN CLASSIFICATION | EVALUATION VALUE |
|---|---|---|
| 1000 | ROTATIONAL SWIPE OPERATION TYPE SCREEN | 6 |
| | TAP OPERATION TYPE SCREEN | 9 |
| | VERTICAL SWIPE OPERATION TYPE SCREEN | 4 |
| 1001 | ROTATIONAL SWIPE OPERATION TYPE SCREEN | 8 |
| | TAP OPERATION TYPE SCREEN | 10 |
| | VERTICAL SWIPE OPERATION TYPE SCREEN | UNACQUIRED |
| 1002 | ROTATIONAL SWIPE OPERATION TYPE SCREEN | 5 |
| | TAP OPERATION TYPE SCREEN | 7 |
| | VERTICAL SWIPE OPERATION TYPE SCREEN | 9 |
| 1003 | ROTATIONAL SWIPE OPERATION TYPE SCREEN | 4 |
| | TAP OPERATION TYPE SCREEN | 10 |
| | VERTICAL SWIPE OPERATION TYPE SCREEN | 6 |
| 1004 | ROTATIONAL SWIPE OPERATION TYPE SCREEN | 10 |
| | TAP OPERATION TYPE SCREEN | 8 |
| | VERTICAL SWIPE OPERATION TYPE SCREEN | 5 |
| 1005 | ROTATIONAL SWIPE OPERATION TYPE SCREEN | 6 |
| | TAP OPERATION TYPE SCREEN | 10 |
| | VERTICAL SWIPE OPERATION TYPE SCREEN | 6 |
| 1006 | ROTATIONAL SWIPE OPERATION TYPE SCREEN | 3 |
| | TAP OPERATION TYPE SCREEN | 9 |
| | VERTICAL SWIPE OPERATION TYPE SCREEN | 7 |
| ⋮ | ⋮ | ⋮ |

GUI SETTING APPARATUS, GUI SETTING METHOD, AND GUI SETTING PROGRAM

CROSS-REFERENCE TO RELATED APPLICATIONS

This application is a continuation of International Application No. PCT/JP2021/037303, filed on Oct. 8, 2021, which claims priority from Japanese Application No. 2020-191913, filed on Nov. 18, 2020. The entire disclosure of each of the above application is incorporated herein by reference.

BACKGROUND

Technical Field

A technique of the present disclosure relates to a GUI setting apparatus, a GUI setting method, and a GUI setting program.

Related Art

An electronic apparatus that receives an operation input from a user based on a graphical user interface (GUI) displayed on a display is known. In the GUI, for example, in regard to aspects of a display form of a graphic element, an operation method of a graphic element, operation sensitivity of a graphic element, an order of screen transition, and a time of screen transition, an easy-to-use aspect is different for each user. JP2016-134694A describes an electronic apparatus that receives information regarding a display aspect of a GUI from a portable terminal individually carried with a user and displays a dedicated GUI for each user.

SUMMARY

The technique of the present disclosure provides a GUI setting apparatus, a GUI setting method, and a GUI setting program capable of easily customizing a GUI for each user.

There is provided a GUI setting apparatus of the present disclosure comprises at least one processor, and a memory incorporated in or connected to the processor, in which the processor is configured to execute evaluation value acquisition processing of acquiring an evaluation value for evaluating an operational feeling of a user with respect to a GUI for operating an electronic apparatus, and GUI setting processing of setting the GUI based on the evaluation value.

The GUI setting processing may have at least one of a first GUI setting mode or a second GUI setting mode, the first GUI setting mode may be a mode where a presented GUI is changed to another GUI in a case where the evaluation value is equal to or less than a set threshold value, and the second GUI setting mode may be a mode where a plurality of kinds of GUIs for the same operation item are presented, and in a case where the evaluation values of the plurality of kinds of presented GUI are acquired in the evaluation value acquisition processing, a GUI of which the evaluation value is relatively high is set.

The evaluation value may include an evaluation value with the number of erroneous operations of the user with respect to a presented GUI as an evaluation item.

The processor may be configured to execute a first GUI setting mode where the presented GUI is changed to another GUI in a case where the evaluation value is equal to or less than a set threshold value in the GUI setting processing, and perform change to a GUI suitable for a content of the erroneous operation of the user instead of the presented GUI in a case where the number of erroneous operations exceeds the set number of times and the evaluation value is equal to or less than the set threshold value.

The processor may be configured to change at least one component of a display form of a graphic element, an operation method of the graphic element, operation sensitivity of the graphic element, an order of screen transition, or a time of the screen transition of the GUI in the GUI setting processing.

The processor may be configured to execute a series of processing including GUI presentation processing of presenting the GUI, the evaluation value acquisition processing, and the GUI setting processing at a set timing.

The series of processing may be repeatedly executed at the set timing.

The processor may be configured to execute GUI generation processing of generating a new GUI different from a GUI set in advance and set the generated GUI in the GUI setting processing.

The GUI setting apparatus may further comprise a GUI data acquisition unit that acquires GUI data necessary for generating the new GUI, and in which the processor may be configured to execute the GUI generation processing based on the acquired GUI data.

The processor may be configured to digitize a deviation amount indicating a degree of deviation of a changed state of a changeable component of the GUI from a set standard state and generate the new GUI in a range in which a total of the deviation amount falls within a determined numerical range in the GUI generation processing.

The processor may be configured to dispose, in a case of disposing GUIs of a plurality of operation items on one screen in the GUI generation processing, the GUI of an operation item having a highest use frequency at a position closest to a center of the screen.

The GUI may be a GUI that is used in an imaging apparatus, and an operation item may be an operation item of a setting operation regarding imaging.

The evaluation value may be an evaluation value with at least one of a setting operation time, a no-operation time, or the number of erroneous operations as an evaluation item, the setting operation time may be a total elapsed time from a start to an end of the setting operation or from the start of the setting operation to a shutter button operation, the no-operation time may be a noncontact time for which the user is not in contact with the GUI, in the setting operation time, and the number of erroneous operations may be the number of erroneous operations that are performed in the setting operation time.

The operation item may include at least one of a stop, a shutter speed, or imaging sensitivity.

The GUI setting apparatus may further include a communication unit that performs communication with the electronic apparatus, in which the processor may be configured to acquire the evaluation value from the electronic apparatus through the communication unit in the evaluation value acquisition processing, and set the GUI of the electronic apparatus based on the evaluation value in the GUI setting processing.

The processor may be configured to acquire a plurality of the evaluation values of the GUI of the same operation item from each of a plurality of the electronic apparatuses in the evaluation value acquisition processing, and set a GUI of an electronic apparatus selected as a setting target based on the plurality of evaluation values in the GUI setting processing.

The processor may be configured to determine the GUI of initial setting of the electronic apparatus based on the plurality of evaluation values.

There is provided a GUI setting method of the present disclosure that executes evaluation value acquisition processing of acquiring an evaluation value for evaluating an operational feeling of a user with respect to a GUI for operating an electronic apparatus, and GUI setting processing of setting the GUI based on the evaluation value.

There is provided a GUI setting program that causes a computer to execute evaluation value acquisition processing of acquiring an evaluation value for evaluating an operational feeling of a user with respect to a GUI for operating an electronic apparatus, and GUI setting processing of setting the GUI based on the evaluation value.

BRIEF DESCRIPTION OF THE DRAWINGS

FIG. 5 is a timing chart showing a flow from setting to imaging in the digital camera.

FIG. 12 is a diagram illustrating processing contents of an evaluation value acquisition processing unit.

FIG. 18 is a timing chart showing a flow from setting to imaging in the digital camera.

FIG. 24 is a table showing a deviation amount of each priority and each change degree for each item of a change portion of a GUI.

FIG. 32 is a table showing an evaluation value of a setting screen of each operation type of each digital camera.

DESCRIPTION

First Embodiment

Figure 1:
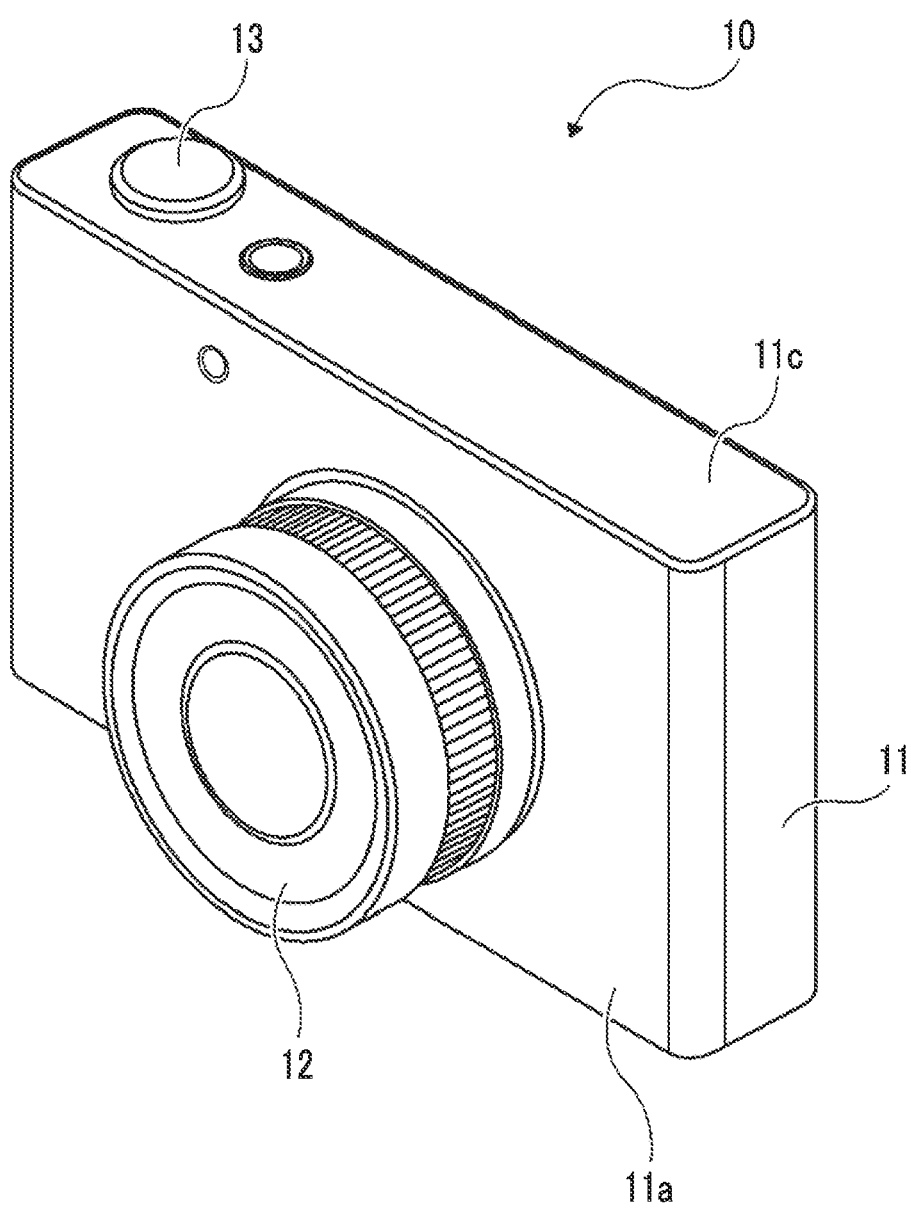
FIG. 1 is a perspective view of a digital camera of a first embodiment viewed from a front surface side.
Figure 2:
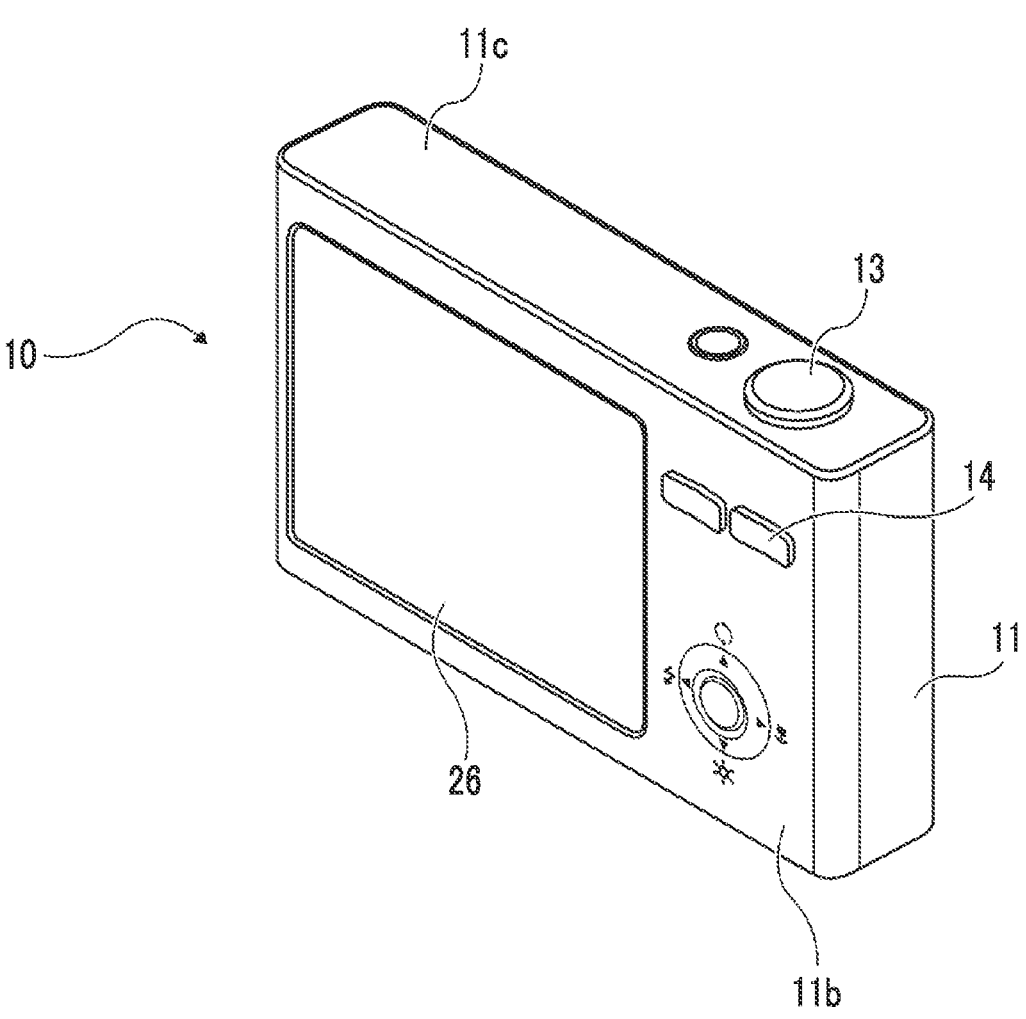
FIG. 2 is a perspective view of the digital camera viewed from a rear surface side.

Hereinafter, an embodiment of the present disclosure will be described referring to the drawings. FIGS. 1 and 2 are appearance diagrams of a digital camera 10 that is a GUI setting apparatus according to a first embodiment of the present disclosure. FIG. 1 is a perspective view of the digital camera 10 viewed from a front surface side, and FIG. 2 is a perspective view of the digital camera 10 viewed from a rear surface side. The digital camera 10 shown in FIGS. 1 and 2 receives an operation input from a user based on a graphical user interface (GUI) displayed on a touch panel 26 of a rear surface 11*b*. The digital camera 10 can customize the GUI displayed on the touch panel 26 for each user. The digital camera 10 is an example of an imaging apparatus in the technique of the present disclosure.

As shown in FIGS. 1 and 2, an imaging lens 12 is provided in a central portion of a front surface 11*a* of a housing 11 of the digital camera 10. Buttons, such as a shutter button 13, are provided on a top surface 11*c* of the housing 11. Furthermore, buttons, such as a setting button 14, and the touch panel 26 are provided on the rear surface 11*b* of the housing 11.

A live view on imaging, a post view after imaging, and the like are displayed on the touch panel 26. The live view is, for example, display of a video that is captured in real time by an imaging unit 24 described below, and is used for framing a subject before imaging with depression of the shutter button 13. The post view is, for example, display of an image captured at a timing at which the shutter button 13 described below is depressed, and is performed for a given time to allow the user to confirm an image after imaging. In a case where the setting button 14 is depressed, a setting screen G (see FIGS. 6, 8, and 10) is displayed.

Figure 3:
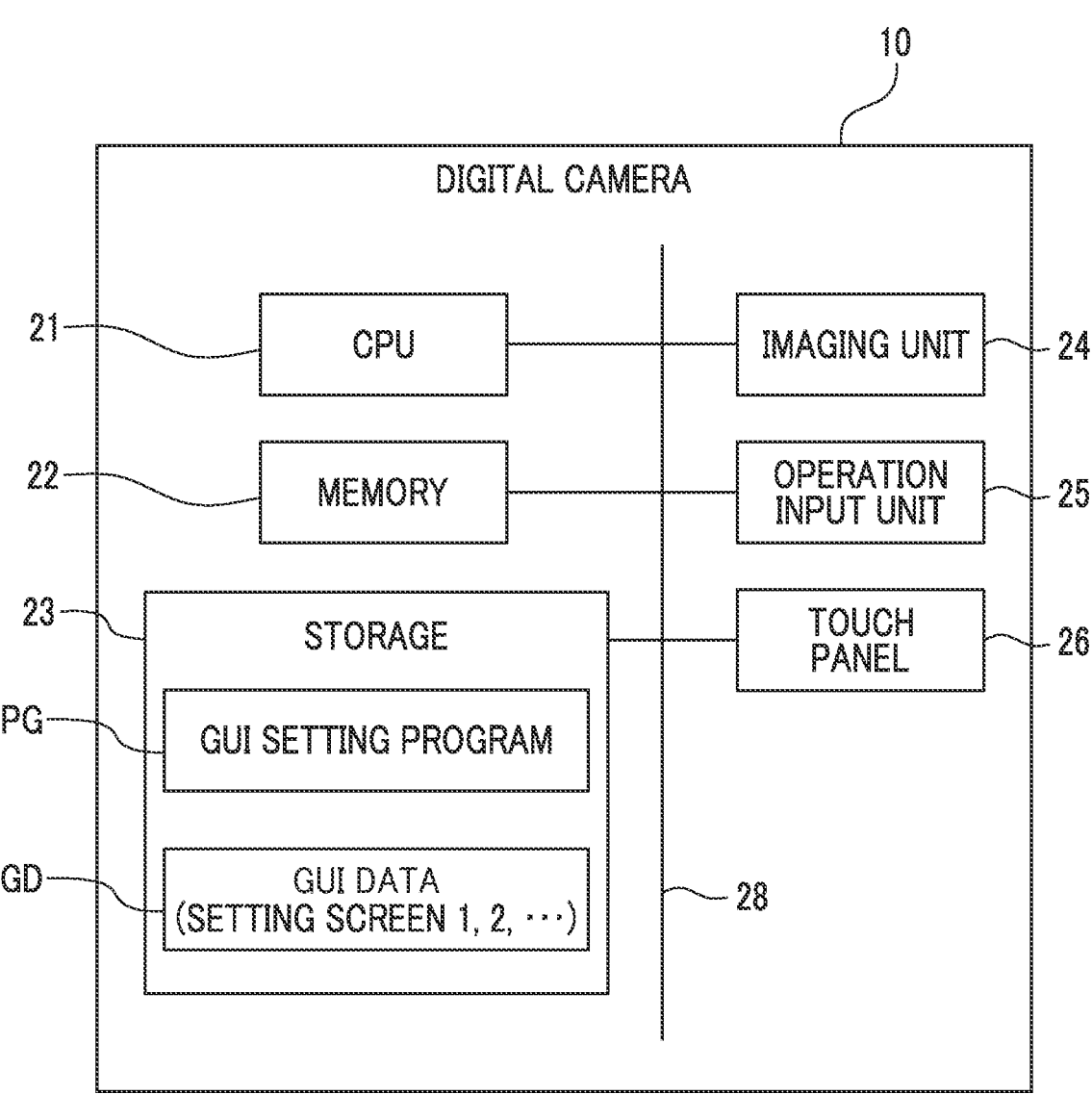
FIG. 3 is a block diagram showing a hardware configuration of the digital camera.

As shown in FIG. 3, the digital camera 10 has a central processing unit (CPU) 21, a memory 22, a storage 23, the imaging unit 24, an operation input unit 25, and the touch panel 26. The respective configurations are connected to be communicable with each other through a bus 28.

The CPU 21 integrally controls each unit of the digital camera 10 by executing a control program and the like. The memory 22 is a work memory and is configured with, for example, a random access memory (RAM). The CPU 21 reads out the control program from the storage 23 to the memory 22 and executes the control program with the memory 22 as a work area. The CPU 21 executes control of each configuration described above and various kinds of processing following the control program.

The CPU 21 is an example of a processor in the technique of the present disclosure. The memory 22 is an example of a memory in the technique of the present disclosure. The digital camera 10 comprising the CPU 21 and the memory 22 also functions as a GUI setting apparatus in the technique of the present disclosure.

The storage 23 stores various programs, such as the control program including an operating system, and application programs, and various kinds of data including image data. The storage 23 is configured with, for example, a non-volatile memory, such as a flash memory. In the present embodiment, a GUI setting program PG is stored as one of various programs in the storage 23. Furthermore, GUI data GD necessary for displaying a GUI is stored. The GUI data GD includes, for example, data necessary for generating a GUI, such as an image of the GUI, character information, and setting information including color and size on display.

The imaging unit 24 comprises the imaging lens 12, an imaging element (not shown), and the like. The imaging unit 24 acquires image data of a subject by imaging the subject.

The operation input unit 25 comprises buttons, such as the shutter button 13 and the setting button 14.

The touch panel 26 has a function as a display unit that displays various images, and a function as an operation input unit that inputs a touch operation.

Figure 4:
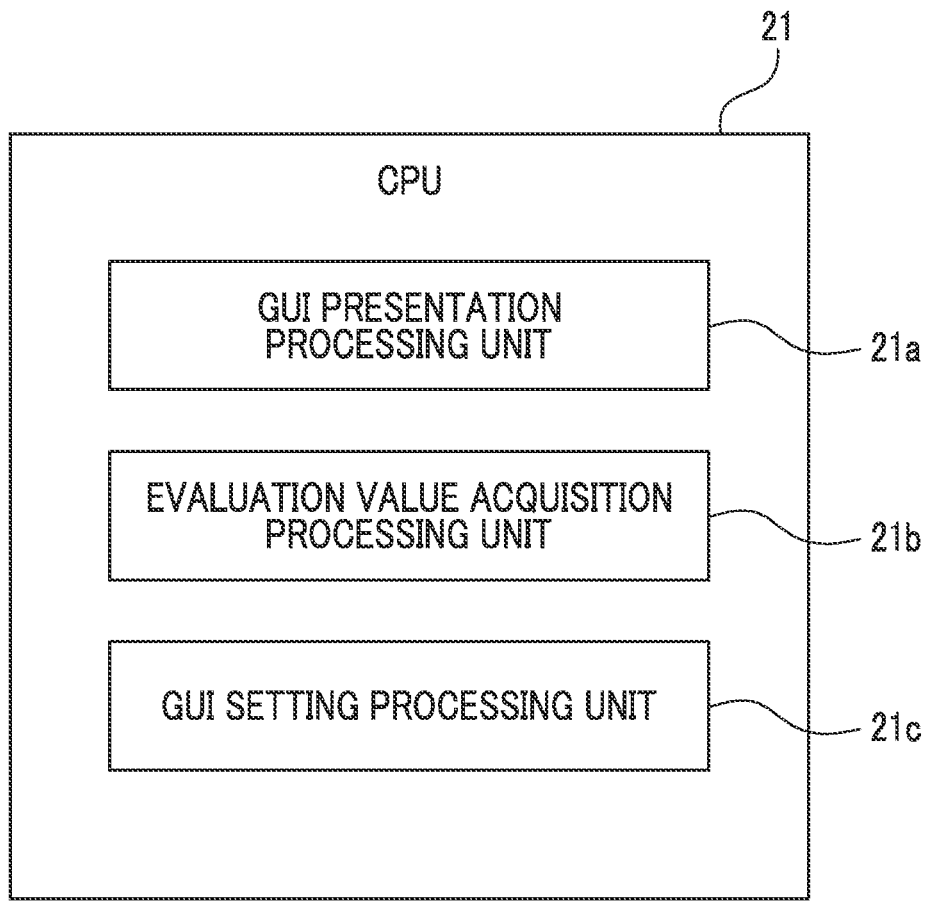
FIG. 4 is a functional block diagram of the digital camera.

As shown in FIG. 4, the CPU 21 functions as a GUI presentation processing unit 21_a_, an evaluation value acquisition processing unit 21_b_, and a GUI setting processing unit 21_c_ by executing the GUI setting program PG stored in the storage 23.

Figure 5:
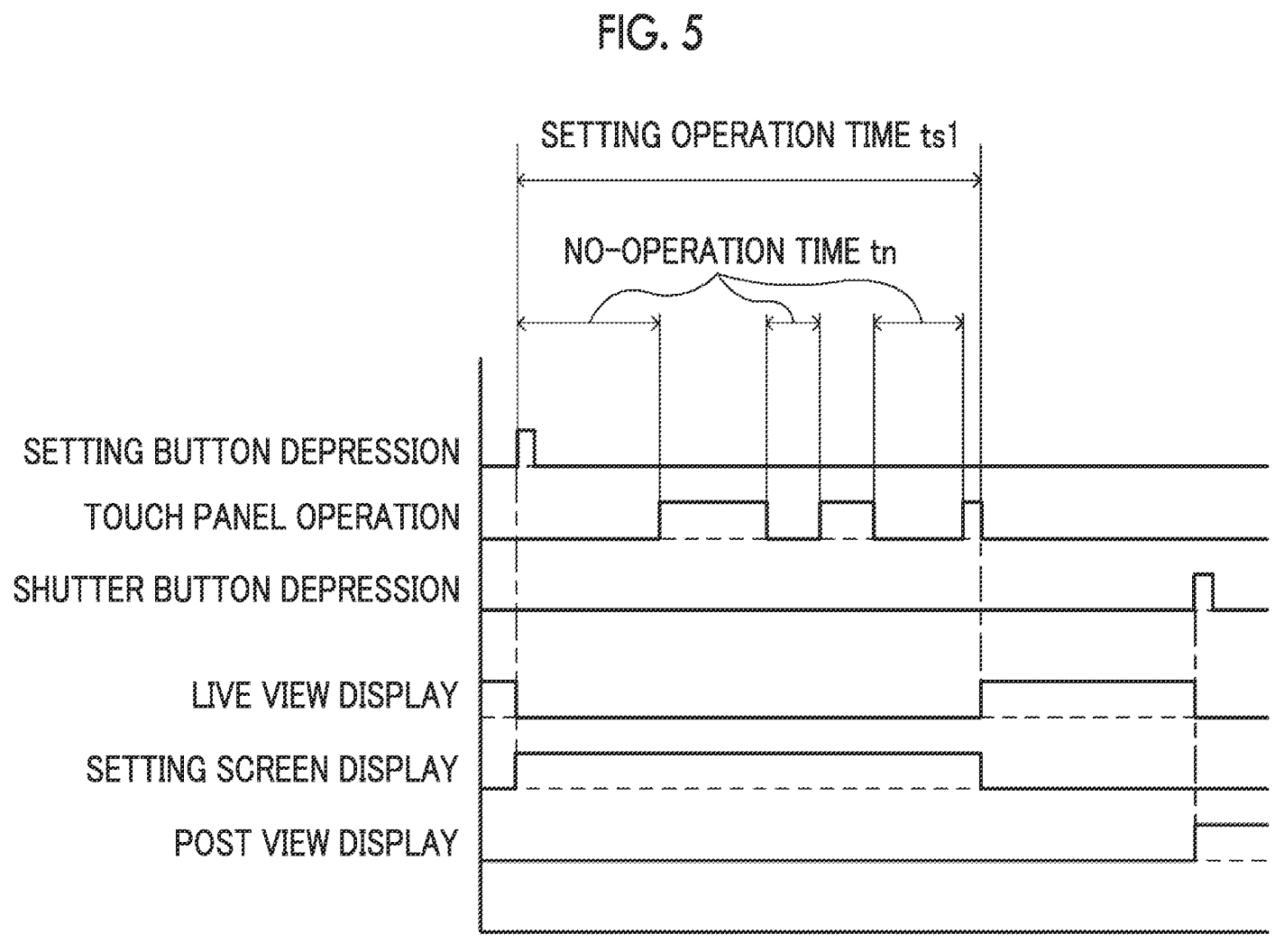

A flow from setting to imaging in the digital camera 10 is as shown in a timing chart shown in FIG. 5 as an example. In a case where the digital camera 10 is in an imaging mode where imaging by the shutter button 13 can be performed in a state of power-on, the live view is continuously displayed. In a case where, for example, the setting button 14 is depressed in a state in which the live view is displayed on the touch panel 26, the CPU 21 displays the setting screen G (see FIGS. 6, 8, and 10) on the touch panel 26. The CPU 21 receives various setting operations from the touch panel 26 in a state in which the setting screen G is displayed on the touch panel 26, and in a case where, for example, the setting button 14 is depressed again and an instruction to end setting is input, ends the display of the setting screen G and resumes the display of the live view on the touch panel 26. In a case where the shutter button 13 is depressed in a state in which the live view is displayed on the touch panel 26, the CPU 21 performs imaging and displays the post view on the touch panel 26 after imaging.

In the present embodiment, a time from a start to an end of the setting operation, that is, a time from the depression of the setting button 14 to the end of the display of the setting screen G is referred to as a setting operation time ts1. The setting operation time ts1 includes a noncontact time for which a finger FG (see FIG. 7 or the like described below) of the user is not in contact with the setting screen G, in addition to a contact time for which the finger FG of the user is in contact with the setting screen G as a GUI. The noncontact time is a time for which an operation in a narrow sense, such as bringing the finger FG into contact with the setting screen G displayed on the touch panel 26, is not performed, and in that sense, the noncontact time in the setting operation time is referred to as a no-operation time tn as shown in FIG. 5.

The GUI presentation processing unit 21_a_ executes GUI presentation processing of presenting a GUI for operating the digital camera 10. An operation screen that is displayed on the touch panel 26 is a GUI that is used in the digital camera 10 as an example of an imaging apparatus, and the setting screen G (see FIGS. 6, 8, and 10) is included in the operation screen. As described above, the setting screen G is displayed on the touch panel 26 with the depression of the setting button 14. The GUI presentation processing unit 21_a_ can present a plurality of kinds of setting screens G as a GUI.

Figure 6:
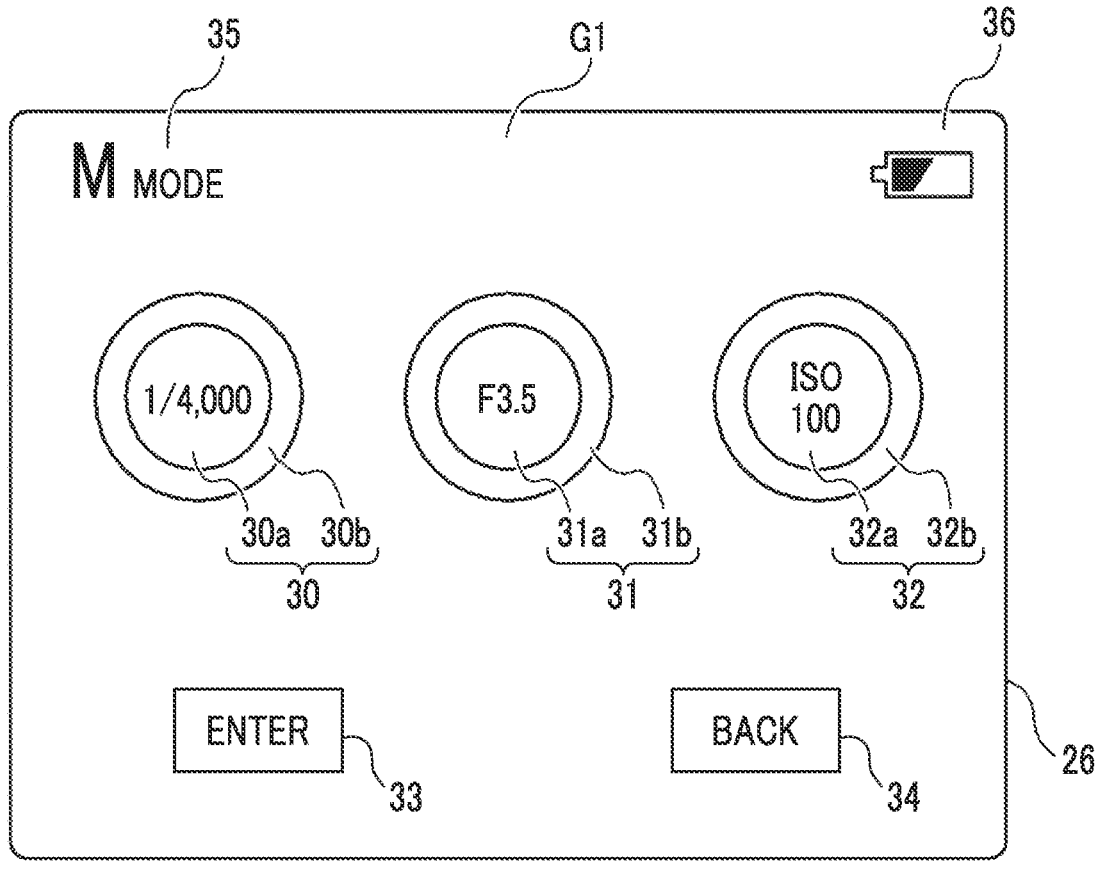
FIG. 6 is a diagram showing a setting screen of a rotational swipe operation type.
Figure 8:
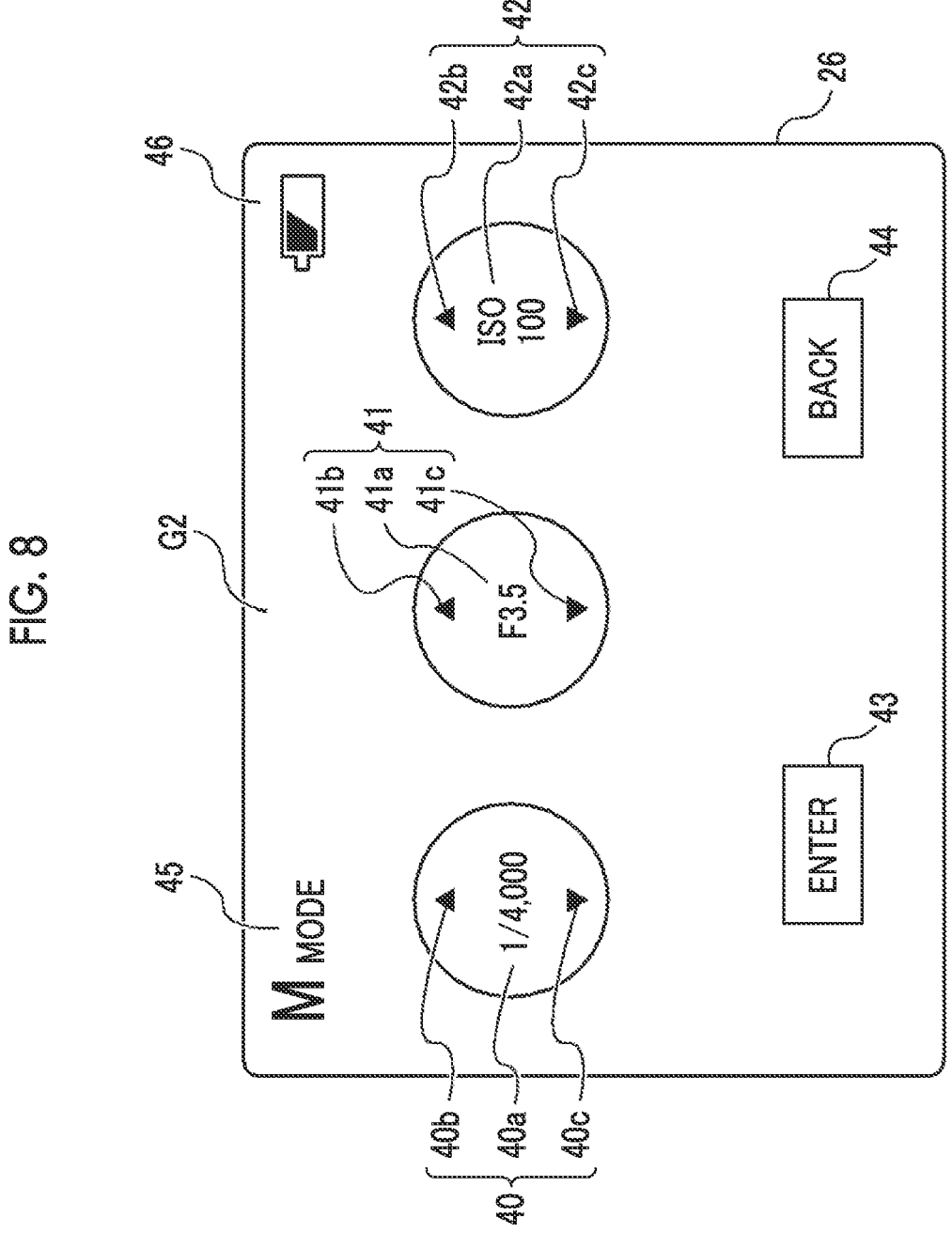
FIG. 8 is a diagram showing a setting screen of a tap operation type.
Figure 10:
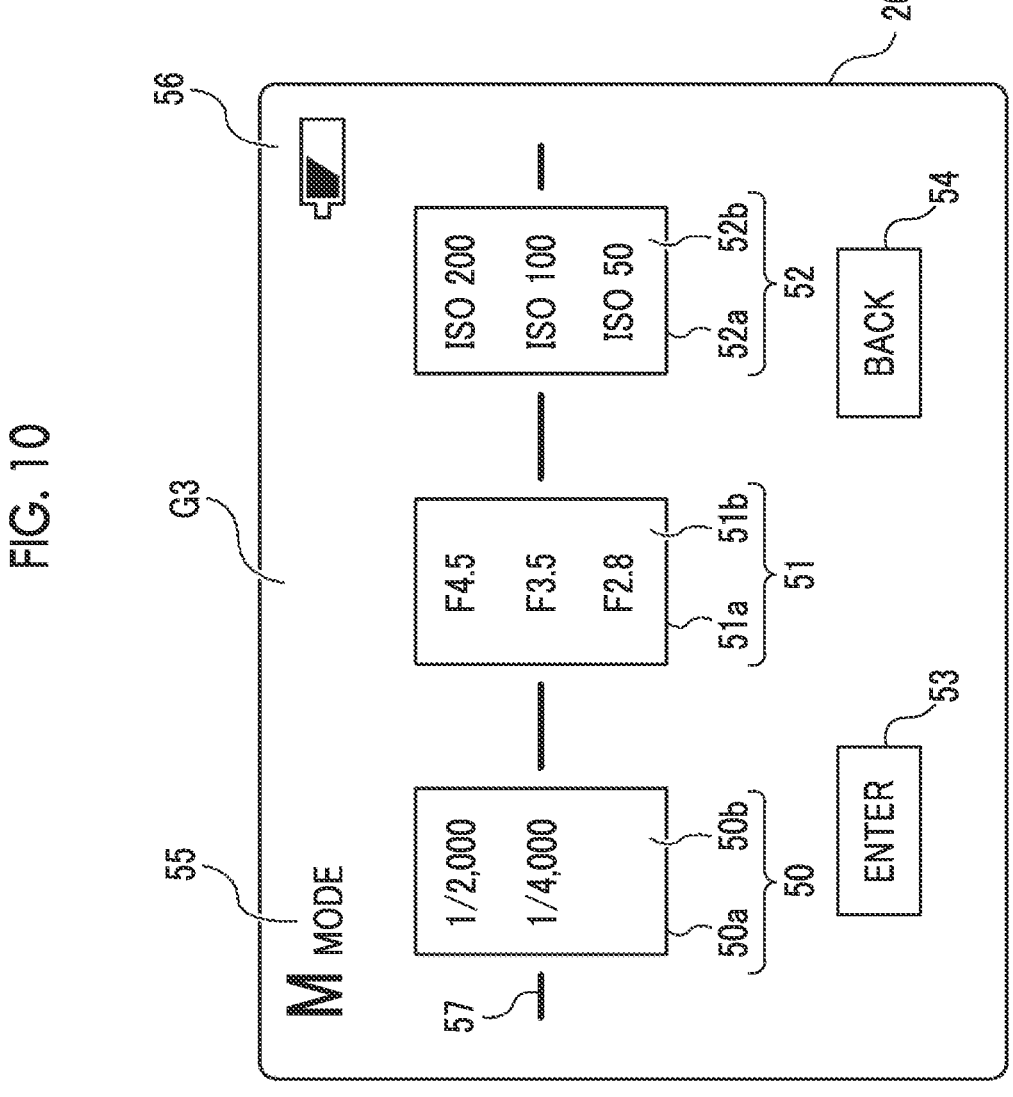
FIG. 10 is a diagram showing a setting screen of a vertical swipe operation type.

In the present example, the GUI presentation processing unit 21_a_ can selectively present three kinds of setting screens G3 of a setting screen G1 shown in FIG. 6, a setting screen G2 shown in FIG. 8, and a setting screen G3 shown in FIG. 10. Here, in the setting screen G, the setting screens G1, G2, and G3 shown in FIGS. 6, 8, and 10, respectively, are distinguished with subdivision numerals "1", "2", and "3" in a case where there is a need for distinction, and are simply referred to as the setting screen G without the subdivision numerals in a case where there is no need for distinction.

In regard to the three kinds of setting screens G1, G2, and G3, as an example, the setting screen G1 shown in FIG. 6 is a rotational swipe operation type, the setting screen G2 shown in FIG. 8 is a tap operation type, and the setting screen G3 shown in FIG. 10 is a vertical swipe operation type. The setting screens G1, G2, and G3 have graphic elements of different operation methods. The graphic elements are components of the GUIs, and as an example, are operation buttons, such as various setting buttons described below. The setting screen G is a GUI for performing a setting operation regarding imaging, and as an example, operation items of a setting operation regarding imaging in the setting screen G are three operation items of a shutter speed, a stop, and imaging sensitivity.

In the digital camera 10, as the setting screen G that is displayed on the touch panel 26 in a case where the setting button 14 is depressed, any of the three kinds of the setting screen G1, the setting screen G2, and the setting screen G3 is set. The GUI presentation processing unit 21_a_ presents the setting screen G as the GUI to the user by displaying the set setting screen G on the touch panel 26.

Figure 7:
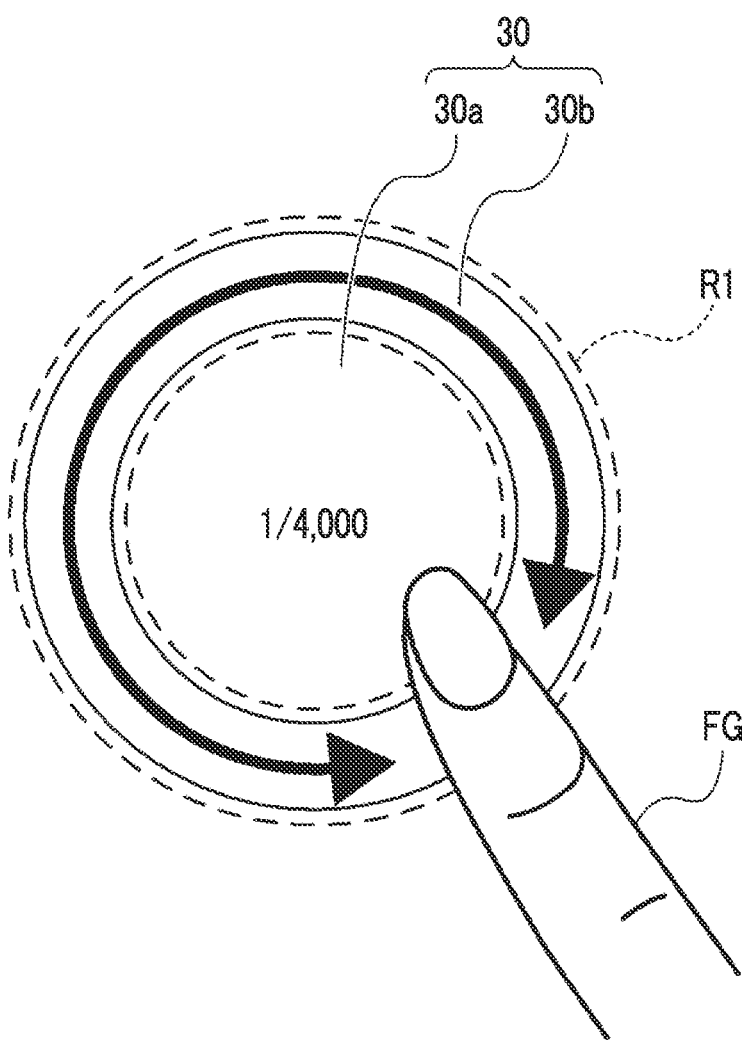
FIG. 7 is a diagram illustrating an operation on the setting screen of the rotational swipe operation type.

As shown in FIG. 6, the setting screen G1 comprises five buttons of a shutter speed setting button 30, an aperture stop setting button 31, an imaging sensitivity setting button 32, an enter button 33, and a back button 34. The setting screen G1 is a rotational swipe operation type as described above, and the shutter speed setting button 30, the aperture stop setting button 31, and the imaging sensitivity setting button 32 are operated by a gesture of a rotational swipe operation. The rotational swipe operation is a touch operation to rotate the contacted finger FG in a substantially circular shape in a state in which the finger FG is brought into contact with the shutter speed setting button 30 or the like, as shown in FIG. 7. The setting screen G1 comprises two information display icons of an imaging mode display icon 35 and a battery remaining amount display icon 36.

The shutter speed setting button 30 comprises a set value display region 30_a_ and an operation region 30_b_. The set value display region 30_a_ is a circular region of a size capable of displaying a set value of a shutter speed inside, and an annular operation region 30_b_ is disposed around the set value display region 30_a_.

As shown in FIG. 7, on the touch panel 26, a detection region R1 is set in conformity with the operation region 30_b_. The detection region R1 is a region including the operation region 30_b_, and is set in an annular shape in conformity with the annular operation region 30_b_. The operation region 30_b_ is a part of the shutter speed setting button 30, and is a part that is displayed to be visible by the user in the setting screen G1. The detection region R1 is a region where an operation with respect to the shutter speed setting button 30 is detected. The detection region R1 is not a visible region in the present example unlike the operation region 30b, but is a region where a touch operation of the user can be detected. The detection region R1 is set, whereby an operation with respect to the shutter speed setting button 30 can be performed by a touch operation with respect to a region one size greater than the operation region 30b, as well as the displayed operation region 30b.

In a case where a rotational swipe operation is performed in a clockwise direction in the operation region 30b in the shutter speed setting button 30, the set value of the shutter speed increases depending on a rotational swipe amount. In a case where a rotational swipe operation is performed in a counterclockwise direction, the set value of the shutter speed decreases depending on a rotational swipe amount. As an example, in a case where a rotational swipe operation with a rotational swipe amount for a rotation angle of 30 degrees is performed, the set value of the shutter speed increases or decreases by one stage depending on a rotation direction. Then, in a case where the rotation angle is 60 degrees, the set value of the shutter speed increases or decreases by two stages.

The aperture stop setting button 31 also comprises a set value display region 31a and an operation region 31b like the shutter speed setting button 30, and a set value is changed like the shutter speed setting button 30. For the aperture stop setting button 31, a detection region R1 one size greater than the operation region 31b is also set.

The imaging sensitivity setting button 32 also comprises a set value display region 32a and an operation region 32b like the shutter speed setting button 30, and a set value is changed like the shutter speed setting button 30. For the imaging sensitivity setting button 32, a detection region R1 one size greater than the operation region 32b is also set.

In a case where the enter button 33 is tapped after the set value of the operation item, such as the shutter speed, is changed by the operation of the shutter speed setting button 30 or the like, the set value of each operation item changed on the setting screen G1 of the rotational swipe operation type is stored, and the display of the setting screen ends.

In a case where the back button 34 is tapped, the set value of each operation item changed on the setting screen G1 of the rotational swipe operation type is not stored, and the display of the setting screen G1 ends.

Figure 9:
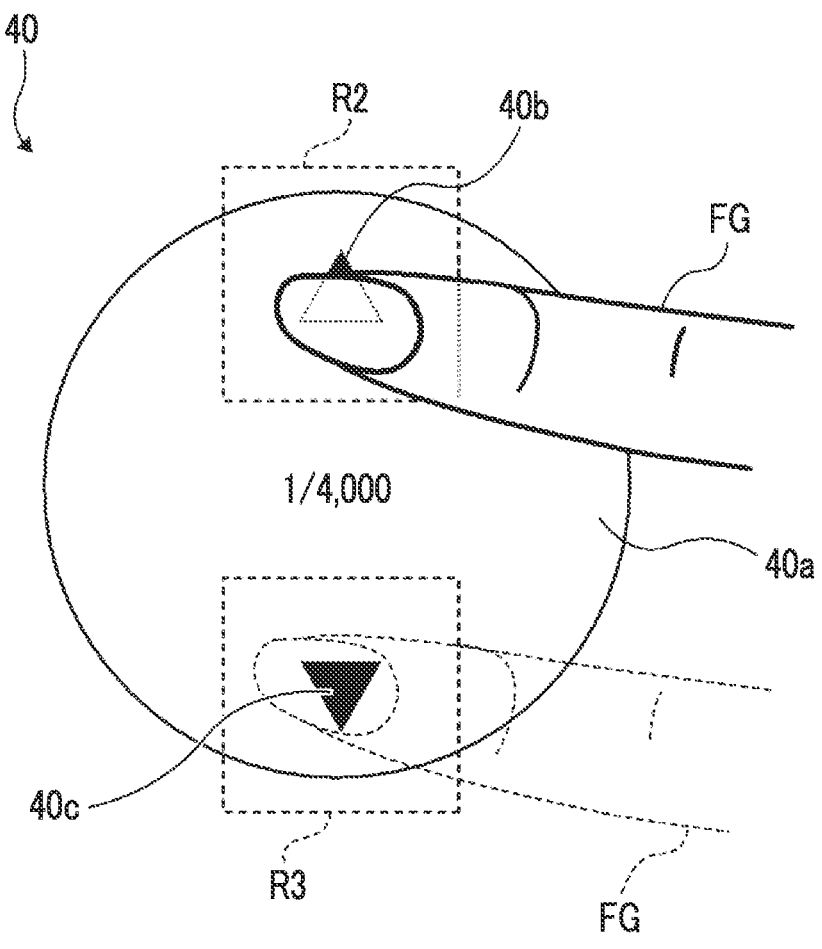
FIG. 9 is a diagram illustrating an operation on the setting screen of the tap operation type.

As shown in FIG. 8, the setting screen G2 comprises five buttons of a shutter speed setting button 40, an aperture stop setting button 41, an imaging sensitivity setting button 42, an enter button 43, and a back button 44. The setting screen G2 is a tap operation type as described above, and the shutter speed setting button 40, the aperture stop setting button 41, and the imaging sensitivity setting button 42 are operated by a gesture of a tap operation. The tap operation is a touch operation to tap the shutter speed setting button 40 or the like with the finger FG as shown in FIG. 9. The setting screen G2 of the tap operation type comprises two information display icons of an imaging mode display icon 45 and a battery remaining amount display icon 46.

The shutter speed setting button 40 comprises a set value display region 40a, an up button 40b, and a down button 40c. The set value display region 40a is a circular region of a size capable of displaying the set value of the shutter speed inside, the up button 40b is disposed in an upper portion of the region, and the down button 40c is disposed in a lower portion.

As shown in FIG. 9, on the touch panel 26, a detection region R2 is set in conformity with the up button 40b, and a detection region R3 is set in conformity with the down button 40c. The detection region R2 is a region including the up button 40b and is a region where an operation to increase the set value of the shutter speed is detected. The detection region R3 is a region including the down button 40c and is a region where an operation to decrease the set value of the shutter speed is detected. The detection regions R2 and R3 of the setting screen G2 shown in FIG. 9 are the same as the detection region R1 of the setting screen G1 shown in FIG. 7. That is, the detection regions R2 and R3 of the setting screen G2 are not visible regions in the present example unlike the up button 40b and the down button 40c displayed to be visible on the setting screen G2, but are regions where a touch operation of the user can be detected. The detection regions R2 and R3 are set, where an operation with respect to the shutter speed setting button 40 can be performed by a touch operation with respect to a region one size greater than the up button 40b or the down button 40c, as well as the displayed up button 40b or the down button 40c.

In a case where a tap operation is performed with respect to the up button 40b in the shutter speed setting button 40, the set value of the shutter speed increases depending on the number of tap operations. In a case where a tap operation is performed with respect to the down button 40c, the set value of the shutter speed decreases depending on the number of tap operations.

The aperture stop setting button 41 also comprises a set value display region 41a, an up button 41b, and a down button 41c like the shutter speed setting button 40, and a set value is changed like the shutter speed setting button 40. For the aperture stop setting button 41, detection regions R2 and R3 one size greater than the up button 41b and the down button 41c are also set.

The imaging sensitivity setting button 42 also comprises a set value display region 42a, an up button 42b, and a down button 42c like the shutter speed setting button 40, and a set value is changed like the shutter speed setting button 40. For the imaging sensitivity setting button 42, detection regions R2 and R3 one size greater than the up button 42b and the down button 42c are set.

In a case where the enter button 43 is tapped after the set value of the operation item, such as the shutter speed, is changed by the operation with respect to the shutter speed setting button 40 or the like, the set value of each operation item changed on the setting screen G2 of the tap operation type is stored, and the display of the setting screen G2 ends.

In a case where the back button 44 is tapped, the set value of each operation item changed on the setting screen G2 of the tap operation type is not stored, and the display of the setting screen G2 ends.

Figure 11:
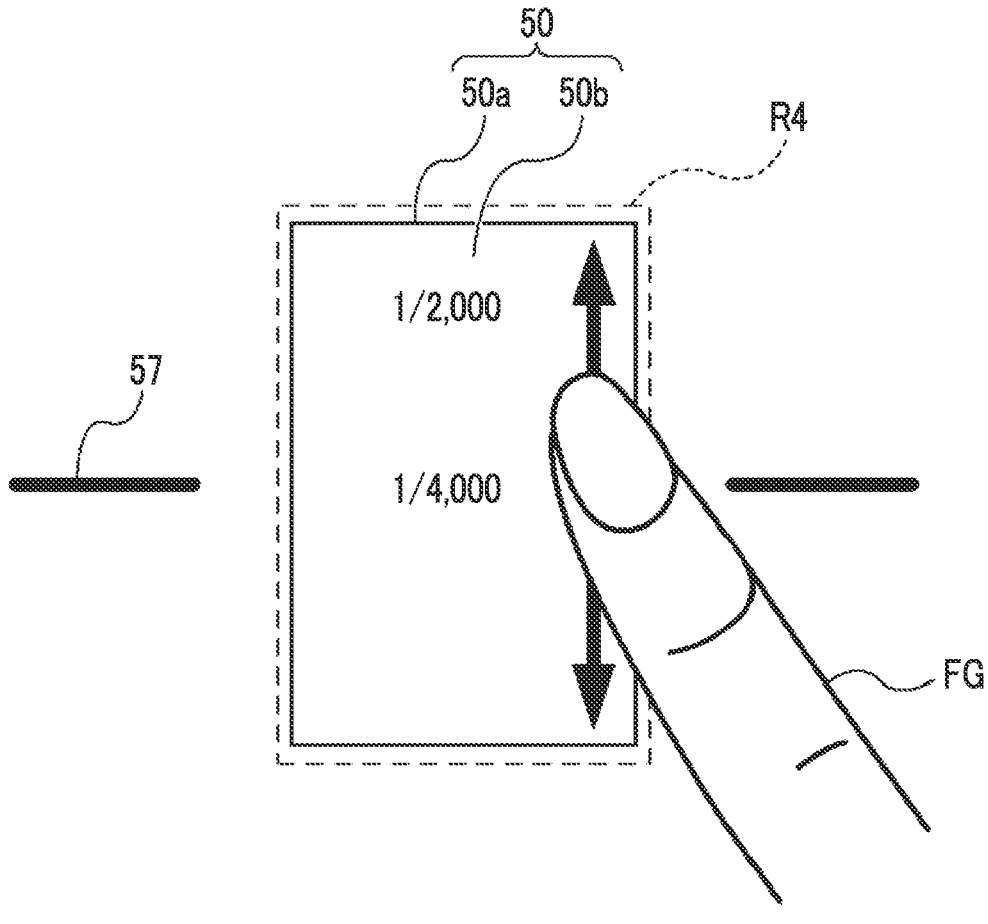
FIG. 11 is a diagram illustrating an operation on the setting screen of the vertical swipe operation type.

As shown in FIG. 10, the setting screen G3 comprises five buttons of a shutter speed setting button 50, an aperture stop setting button 51, an imaging sensitivity setting button 52, an enter button 53, and a back button 54. The setting screen G3 is a vertical swipe operation type as described above, and the shutter speed setting button 50, the aperture stop setting button 51, and the imaging sensitivity setting button 52 are operated by a gesture of a vertical swipe operation. The vertical swipe operation is a touch operation to slide the contacted finger FG in an up direction or a down direction in a state in which the finger FG is brought into contact with the shutter speed setting button 50 or the like, as shown in FIG. 11. The setting screen G3 of the vertical swipe operation type comprises two information display icons of an imaging mode display icon 55 and a battery remaining amount display icon 56.

The shutter speed setting button 50 comprises a display frame 50*a* and a set value designation portion 50*b*. The set value designation portion 50*b* can be scrolled in an up-down direction with respect to the display frame 50*a*. In a case where the set value designation portion 50*b* is scrolled in the up-down direction, the set value of the shutter speed displayed in the display frame 50*a* is changed. In a case where the set value designation portion 50*b* is scrolled upward, the set value decreases, and in a case where the set value designation portion 50*b* is scrolled downward, the set value increases. A center line 57 that is positioned at the center of the display frame 50*a* in the up-down direction is provided on the right and left sides of the display frame 50*a*. In the present example, three set values are displayed in the display frame 50*a*, and the three set values are changed in stages by scrolling the set value designation portion 50*b* vertically. Among the three set values, the set value corresponding to the position of the center line 57 is a designated set value. That is, the user scrolls the set value designation portion 50*b* in the up-down direction in a case of designating the set value, and makes the set value desired to be designated conform to the position of the center line 57.

As shown in FIG. 11, on the touch panel 26, a detection region R4 is set in conformity with the display frame 50*a*. The detection region R4 is a region including the display frame 50*a* and is set in a rectangular shape in conformity with the rectangular display frame 50*a*. The detection region R4 is a region where an operation with respect to the shutter speed setting button 50 is detected. The detection region R4 of the setting screen G3 shown in FIG. 11 is the same as the detection region R1 of the setting screen G1 shown in FIG. 7. That is, the detection region R4 of the setting screen G3 is not a visible region in the present example unlike the display frames 50*a* and the set value designation portion 50*b* displayed to be visible on the setting screen G3, but is a region where a touch operation of the user can be detected. The detection region R4 is set, whereby an operation with respect to the shutter speed setting button 50 can be performed by a touch operation with respect to a region one size greater than the display frame 50*a* and the set value designation portion 50*b*, as well as the displayed display frame 50*a* and the set value designation portion 50*b*.

In a case where a swipe operation is performed in the down direction in the display frame 50*a* of the shutter speed setting button 50, the set value designation portion 50*b* is scrolled in the down direction, and the set value of the shutter speed displayed in the display frame 50*a* increases depending on a swipe amount. In a case where a swipe operation is performed in the up direction, the set value designation portion 50*b* is scrolled in the up direction, and the set value of the shutter speed displayed in the display frame 50*a* decreases depending on a swipe amount. Through the swipe operation, the set value desired to be designated is made to conform to the center line 57.

The aperture stop setting button 51 also comprises a display frame 51*a* and a set value designation portion 51*b* like the shutter speed setting button 50, and a set value is changed like the shutter speed setting button 50. For the aperture stop setting button 51, a detection region R4 one size greater than the display frame 51*a* and the set value designation portion 51*b* is also set.

The imaging sensitivity setting button 52 comprises a display frame 52*a* and a set value designation portion 52*b* like the shutter speed setting button 50, and a set value is changed like the shutter speed setting button 50. For the imaging sensitivity setting button 52, a detection region R4 one size greater than the display frame 52*a* and the set value designation portion 52*b* is also set.

In a case where the enter button 53 is tapped after the set value of the operation item, such as the shutter speed, is changed by the operation of the shutter speed setting button 50 or the like, the set value of each operation item changed on the setting screen G3 of the vertical swipe operation type is stored, and the display of the setting screen G3 ends.

In a case where the back button 54 is tapped, the set value of each operation item changed on the setting screen G3 of the vertical swipe operation type is not stored, and the display of the setting screen G3 ends.

The evaluation value acquisition processing unit 21*b* executes evaluation value acquisition processing of acquiring an evaluation value for evaluating an operational feeling of the user with respect to a presented GUI among the setting screen G1 to the setting screen G3, for example. The evaluation value is an evaluation value with the number of erroneous operations of the user with respect to the presented GUI as an evaluation item as an example. Here, the number of erroneous operations is the number of erroneous operations performed in the setting operation time ts1 shown in FIG. 5. In regard to the evaluation value in this case, as the number of erroneous operations is greater, the evaluation value is set to be lower, and as the number of erroneous operations is smaller, the evaluation value is set to be higher.

The erroneous operation refers to a case where, in a case where any of the setting screen G1 to the setting screen G3 is presented as a GUI, the user performs a touch operation by a wrong operation method with respect to a correct operation method of the presented GUI. For example, in a case where the setting screen G1 of the rotational swipe operation type shown in FIG. 6 is displayed on the touch panel 26, a correct operation method with respect to the shutter speed setting button 30, the aperture stop setting button 31, and the imaging sensitivity setting button 32 is a rotational swipe operation as shown in FIG. 7. In contrast, the erroneous operation refers to a case where, for example, in a case where the setting screen G1 of the rotational swipe operation type is displayed, the tap operation shown in FIG. 9 or the vertical swipe operation shown in FIG. 11 is performed with respect to an upper portion and a lower portion of each button of the shutter speed setting button 30, the aperture stop setting button 31, and the imaging sensitivity setting button 32.

As shown in FIG. 12, the evaluation value acquisition processing unit 21*b* determines that, in a case where the setting screen G1 of the rotational swipe operation type is displayed, an erroneous operation is performed in a case where a touch operation other than the rotational swipe operation shown in FIG. 7 is performed, such as a case where the tap operation shown in FIG. 9 or the vertical swipe operation shown in FIG. 11 is performed. The evaluation value acquisition processing unit 21*b* also records the number of erroneous operations. For example, it is considered that the user repeats a touch operation in a case where the set value is not changed as the user wants even though the user performs a touch operation. In a case where an erroneous operation is repeated as a touch operation, the evaluation value acquisition processing unit 21*b* records the number of repeated erroneous operations. The evaluation value acquisition processing unit 21*b* acquires the evaluation value by deriving the evaluation value based on the number of erroneous operations.

The evaluation value acquisition processing unit 21*b* also records the contents of the erroneous operations, such as which of a tap operation or a vertical swipe operation is performed as an erroneous operation, as well as the number of erroneous operations. As an example, the number of erroneous operations is recorded for each of the contents of the erroneous operations in such a manner that how many times the tap operation is performed or how many times the vertical swipe operation is performed.

In FIG. 4, the GUI setting processing unit 21*c* executes GUI setting processing of setting a GUI based on the evaluation value acquired by the evaluation value acquisition processing unit 21*b*.

In the present embodiment, the GUI setting processing is performed in a first GUI setting mode. The first GUI setting mode is a mode where one GUI, such as the setting screen G1, is first presented, and in a case where the evaluation value with respect to the presented GUI is equal to or less than a set threshold value, the presented GUI is changed to another GUI.

The GUI setting processing unit 21*c* performs change to a GUI suitable for the content of the erroneous operation of the user instead of the presented GUI in a case where the number of erroneous operations in the presented GUI exceeds the set number of times and the evaluation value is equal to or less than the set threshold value, as an example.

Figure 13:
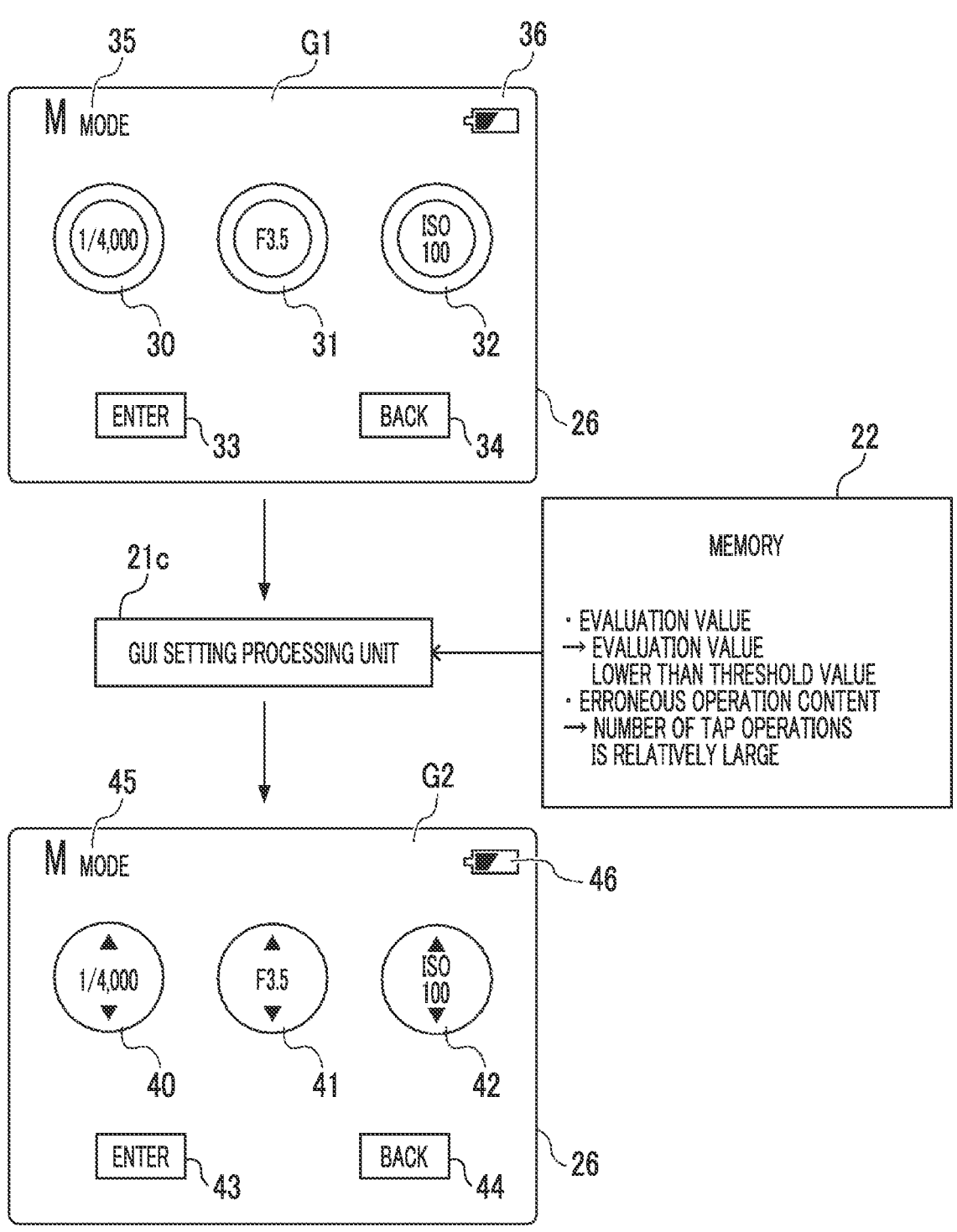
FIG. 13 is a diagram illustrating processing contents of a GUI setting processing unit.

As shown in FIG. 13, for example, a case where, in a case where the setting screen G1 of the rotational swipe operation type is displayed, the GUI setting processing unit 21*c* acquires an evaluation value lower than the threshold value from the evaluation value acquisition processing unit 21*b* is considered. In the present example, as the number of erroneous operations is greater, the evaluation value is lower. In the present example, as the number of erroneous operations in the presented setting screen G1 of the rotational swipe operation type is greater, the evaluation value is lower. For this reason, the GUI setting processing unit 21*c* changes the setting screen G1 as the presented GUI to another GUI. Then, a GUI to be changed is determined depending on the content of the erroneous operation. In a case where, for example, the number of erroneous operations of the tap operation as the content of the erroneous operation is relatively greater than other erroneous operations, the GUI setting processing unit 21*c* determines that the GUI suitable for the content of the erroneous operation of the user is the setting screen G2 of the tap operation type. Accordingly, the GUI setting processing unit 21*c* performs change to the setting screen G2 of the tap operation type instead of the setting screen G1 of the rotational swipe operation type. The GUI presentation processing unit 21*a* presents the setting screen G2 as the changed GUI on display of a next setting screen G.

In the present example, a series of processing including the GUI presentation processing by the GUI presentation processing unit 21*a*, the evaluation value acquisition processing by the evaluation value acquisition processing unit 21*b*, and the GUI setting processing by the GUI setting processing unit 21*c* is performed only once in a period from power-on to power-off of the digital camera 10. That is, in a case where the change of the presented GUI is performed once after power-on of the digital camera 10, the change of the GUI is not performed until power-off.

[Flow of Processing]

Next, a flow of processing on GUI setting in the digital camera 10 will be described using flowcharts shown in FIGS. 14 and 15. In a case where the digital camera 10 is powered on and is in an imaging mode, the digital camera 10 performs the display of the live view on the touch panel 26. The flowchart shown in FIG. 14 shows processing on a premise that the display of the live view is performed after the digital camera 10 is powered on.

Figure 14:
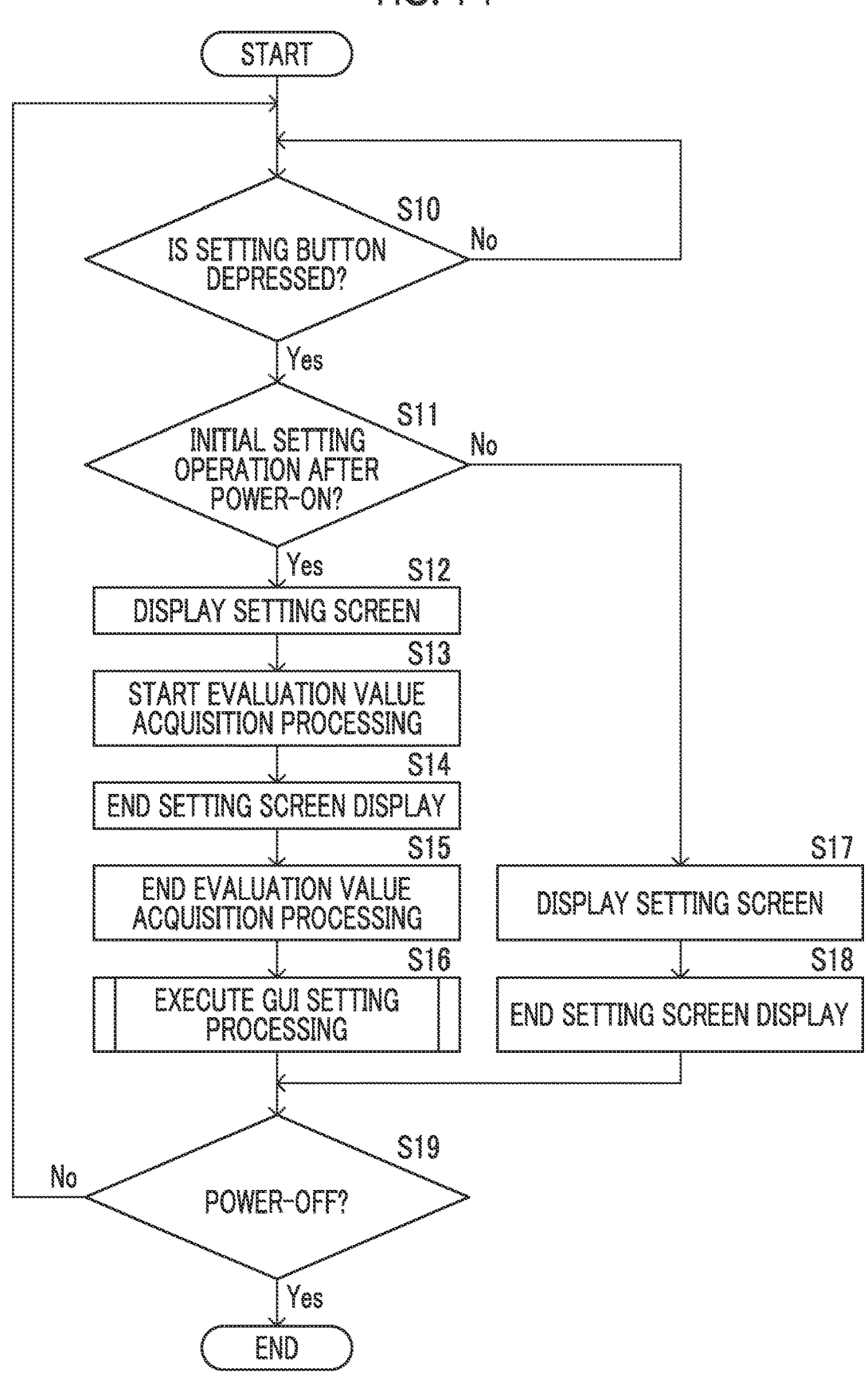
FIG. 14 is a flowchart illustrating processing on GUI setting in the first embodiment.

As shown in FIG. 14, in a case where the setting button 14 is depressed in a state in which the live view is displayed on the touch panel 26 (in Step S10, determination is made to be Yes), first, the CPU 21 determines whether or not a setting operation is an initial setting operation after the digital camera 10 is powered on (Step S11).

In a case where determination is made in Step S11 that the setting operation is the initial setting operation after the digital camera 10 is powered on (in Step S11, determination is made to be Yes), the GUI presentation processing unit 21*a* displays the setting screen G on the touch panel 26 (Step S12). With this, the setting screen G as the GUI is presented to the user.

The setting screen G that is displayed on the touch panel 26 in the initial setting operation after power-on is the setting screen G set at a point of time of latest power-off among the setting screen G1 of the rotational swipe operation type, the setting screen G2 of the tap operation type, and the setting screen G3 of the vertical swipe operation type. In an initial state of the digital camera 10 at the time of factory shipment, for example, the setting screen G1 of the rotational swipe operation type is initially set.

Next, the evaluation value acquisition processing unit 21*b* starts the evaluation value acquisition processing on the setting screen G presented on the touch panel 26 as the GUI (Step S13). In the evaluation value acquisition processing, the number of erroneous operations and the content of the erroneous operation are recorded.

Next, in a case where an instruction to end the setting is input from the touch panel 26, the evaluation value acquisition processing unit 21*b* ends the display of the setting screen G (Step S14), and ends the evaluation value acquisition processing (Step S15).

Next, the GUI setting processing unit 21*c* executes the GUI setting processing (Step S16).

Figure 15:
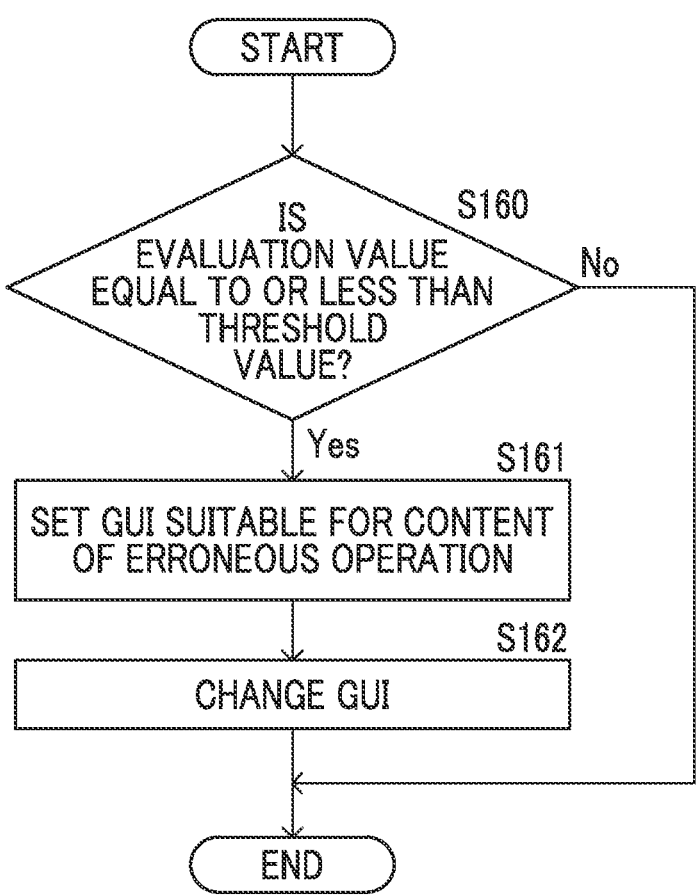
FIG. 15 is a flowchart illustrating details of GUI setting processing in the first embodiment.

In the GUI setting processing, in detail, as shown in FIG. 15, first, determination is performed whether or not the evaluation value on the setting screen G as the presented GUI is equal or less than the threshold value (Step S160). In a case where the evaluation value is equal to or less than the threshold value (in Step S160, determination is made to be Yes), the GUI setting processing unit 21*c* sets a setting screen G (an example of a GUI) suitable for the content of the erroneous operation of the user based on the recorded content of the erroneous operation (Step S161).

For example, in a case where the setting screen G1 of the rotational swipe operation type is presented as the GUI, and in a case where the evaluation value is equal to or less than the threshold value, and the number of erroneous operations of the tap operation on the contents of the erroneous operation at this moment is relatively large, the GUI setting processing unit 21*c* performs change to the setting screen G2 of the tap operation type instead of the setting screen G1 of the rotational swipe operation type.

Next, the GUI setting processing unit 21*c* changes the next setting screen G to the setting screen G (an example of a GUI) set in Step S161 (Step S162), and proceeds to Step S19 of FIG. 14.

In a case where the evaluation value is greater than the threshold value in Step S160 (in Step S160, determination is made to be No), the GUI setting processing unit 21*c* does not change the setting screen G (an example of a GUI), remains the original setting screen G, and proceeds to Step S19 of FIG. 14.

Returning to the flowchart of FIG. 14, the CPU 21 repeats the processing of Steps S10 to S16 until the digital camera 10 is powered off (in Step S19, determination is made to be Yes).

In a case where, in Step S11, the setting operation is not the initial setting operation after the digital camera 10 is powered on (in Step S11, determination is made to be No), the GUI presentation processing unit 21a displays a setting screen G on the touch panel 26 (Step S17). In the setting screen G that is displayed in this case, the setting screen G set through the GUI setting processing in Step S16 is presented. In Step S17, since the setting screen G is presented as in Step S12, but the setting operation is not the initial setting operation, the evaluation value acquisition processing unit 21b does not execute the evaluation value acquisition processing. Since the evaluation value acquisition processing is not executed, the GUI setting processing by the GUI setting processing unit 21c is also not executed.

In a case where an instruction to end the setting is input from the touch panel 26, the CPU 21 ends the display of the setting screen G (Step S18), and proceeds to Step S19.

Operations and Effects

The CPU 21 of the digital camera 10 in the present embodiment executes the evaluation value acquisition processing of acquiring the evaluation value for evaluating the operational feeling of the user with respect to the GUI (as an example, the setting screen G), and the GUI setting processing of setting the GUI based on the evaluation value.

In this way, the GUI is set based on the evaluation value indicating the operational feeling of the user, whereby it is possible to customize the GUI matching the operational feeling of the user, instead of making the user customize the GUI personally. Since the user may only perform a setting operation that is performed normally, for customization, customization is easily performed for each user. Therefore, the technique of the present disclosure can easily customize the GUI for each user.

The GUI setting processing has the first GUI setting mode where, in a case where the evaluation value is equal to or less than the set threshold value, the presented GUI is changed to another GUI. The GUI is set in the first GUI setting mode, whereby it is possible to perform change to another GUI in a case where the presented GUI is not suitable for the operational feeling of the user. For this reason, it is possible to exclude the GUI that is not suitable for the operational feeling of the user.

The evaluation value includes the evaluation value with the number of erroneous operations of the user with respect to the presented GUI as the evaluation item. It is considered that the number of erroneous operations is an index directly indicating the operational feeling of the user. The number of erroneous operations is set as the evaluation value, whereby it is possible to appropriately infer whether or not the presented GUI is suitable for the operational feeling of the user.

The CPU 21 executes the first GUI setting mode in the GUI setting processing, whereby, in a case where the number of erroneous operations exceeds the set number of times and the evaluation value is equal to or less than the set threshold value, the CPU 21 performs change to the GUI suitable for the content of the erroneous operation of the user instead of the presented GUI. According to this aspect, it is possible to display an easy-to-use GUI for the user where an erroneous operation is difficult to occur.

In the above-described example, the CPU 21 changes a display form of a graphic element and an operation method of a graphic element as a component of the GUI by changing the GUI from the setting screen G1 to the setting screen G2 as an example in the GUI setting processing. The display form of the graphic element and the operation method of the graphic element generally have a comparatively strong influence on the operational feeling of the user. With the change of the component, it is easy to accurately evaluate whether or not a GUI to be presented and a GUI to be changed are suitable for the operational feeling of the user. In a case where the suitability of the operational feeling can be accurately evaluated, as a result, it is easy to match a GUI more suitable for the operational feeling of the user.

As the component of the GUI, in addition to the display form of the graphic element and the operation method of the graphic element shown in the above-describe example, there are operation sensitivity of a graphic element, an order of screen transition, a time of screen transition, and the like, and a method for changing a GUI by changing such components is also used. The operation sensitivity of the graphic element is, for example, operation sensitivity for determining whether or not a touch operation is performed with respect to the shutter speed setting button 30. The operation sensitivity is, for example, a contact time of the finger FG. Alternatively, the operation sensitivity may be changed by changing the size of the detection region R1 or the like to change an area where a touch operation is detected. The order of screen transition is an order of transition of each sub-screen in a case where the setting screen G is composed of a plurality of hierarchical sub-screens, and the time of screen transition is a time of switching from one sub-screen to another sub-screen. The operational feeling significantly varies depending on how the order of transition of the sub-screens is set. In a case where the time for which the sub-screens are switched is too short, erroneous operations may be increased.

In this way, the component other than the display form of the graphic element and the operation method of the graphic element can be an index for evaluating whether or not a GUI is suitable for the operational feeling of the user. Therefore, in the technique of the present disclosure, a method of changing a GUI is not limited to the above-described example, and at least one component of the display form of the graphic element, the operation method of the graphic element, the operation sensitivity of the graphic element, the order of screen transition, or the time of screen transition may be changed.

The CPU 21 executes the series of processing including the GUI presentation processing, the evaluation value acquisition processing, and the GUI setting processing at a set timing in a period during which the digital camera 10 as an example of an electronic apparatus is powered on. An aspect where the series of processing is executed at the set timing during power-on is made, whereby various effects are obtained depending on the setting of the timing. For example, in the above-described example, the set timing is the time of an initial setting operation after power-on. In a case where such an aspect is made, the evaluation value is updated only once after power-on. For this reason, the change of the GUI is performed once at most. For this reason, it is possible to suppress the power consumption of the digital camera 10, compared to an aspect where the acquisition of the evaluation value and the change of the GUI are repeated many times during power-on.

Figure 16:
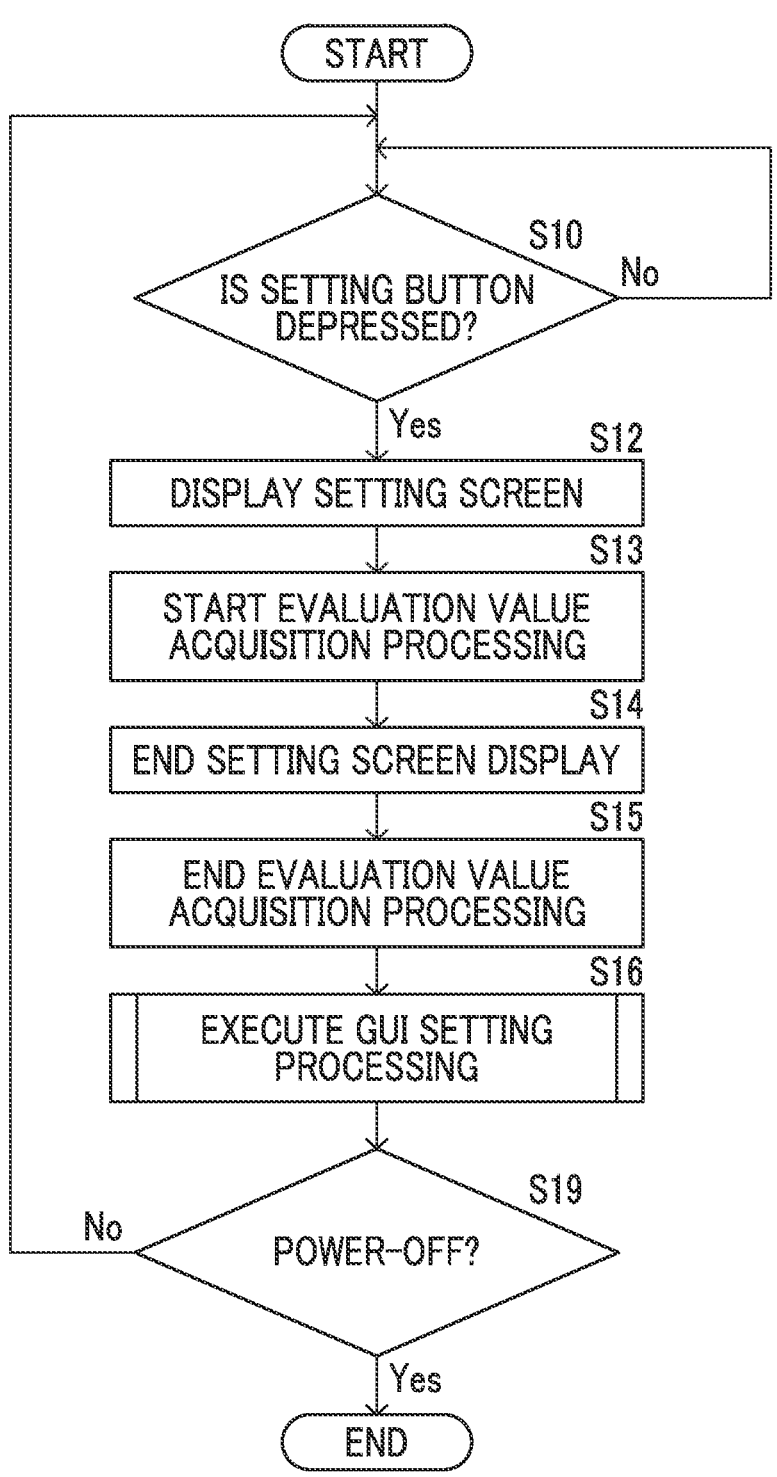
FIG. 16 is a flowchart illustrating processing on GUI setting in a modification example of the first embodiment.

Unlike the above-described example, the CPU 21 may repeatedly execute the series of processing including the GUI presentation processing, the evaluation value acquisition processing, and the GUI setting processing at a set timing as in a flowchart shown in FIG. 16. The flowchart shown in FIG. 16 is the same as the flowchart shown in FIG. 14, except that Steps S11, S17, and S18 are removed from the flowchart of FIG. 14. In the flowchart shown in FIG. 16, each time the setting screen G is displayed during power-on, the GUI presentation processing, the evaluation value acquisition processing, and the GUI setting processing are executed. In the example of FIG. 16, the set timing is a timing at which the setting operation is performed, and the series of processing is repeatedly executed at the timing.

In this way, the series of processing may be repeatedly executed at the set timing. The series of processing is repeatedly executed, whereby it is possible to make a GUI approach a GUI of user's preference. In the present example, there are the three setting screens G1 to G3 as the GUI, and one setting screen G among the three setting screens G is selected depending on the evaluation value. The series of processing is repeated as shown in FIG. 16, whereby the setting screen G most suitable for the operational feeling of the user among the three setting screens G is easily selected.

Figure 17:
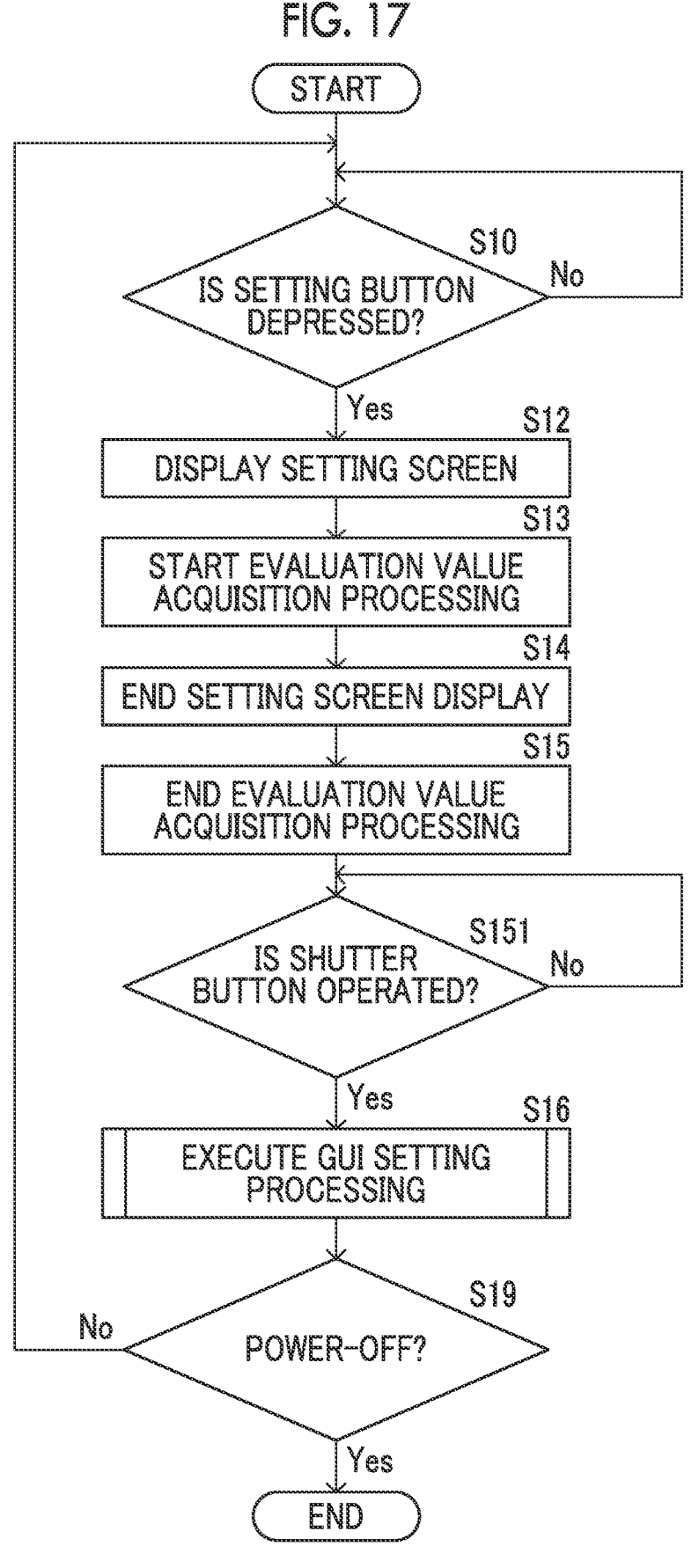
FIG. 17 is a flowchart illustrating processing on GUI setting in a modification example of the first embodiment.

As shown in FIG. 17, even in a case where the evaluation value acquisition processing is executed, in a case where the shutter button 13 is not operated, the GUI setting processing may not be executed. A flowchart shown in FIG. 17 is the same as the flowchart of FIG. 16, except that Step S151 is added between Steps S15 and S16 with respect to the flowchart of FIG. 16. In the flowchart shown in FIG. 17, after the evaluation value acquisition processing ends in Step S15, in Step S151, determination is performed whether or not the shutter button 13 is operated. In a case where the shutter button 13 is not operated (in Step S151, determination is made to be NO), the GUI setting processing is not executed, and in a case where the shutter button 13 is operated (in Step S151, determination is made to be YES), the GUI setting processing is executed. That is, the timing at which the series of processing including the GUI presentation processing, the evaluation value acquisition processing, and the GUI setting processing is performed is a timing at which the setting operation is performed and the shutter button 13 is operated. In this manner, since the GUI setting processing is not executed only by performing the setting operation, a frequency of the GUI setting processing is suppressed, whereby it is possible to suppress power consumption.

The example shown in FIG. 17 and the example shown in FIG. 14 may be combined. That is, the GUI setting processing is executed in a case where both operations of the setting operation and the operation of the shutter button 13 are initially performed after the digital camera 10 is powered on. Then, the GUI setting processing is not executed thereafter until power-off. Even in this manner, it is possible to suppress power consumption.

The GUI is a GUI that is used in the digital camera 10 as an imaging apparatus, and the operation item is the operation item of the setting operation regarding imaging. According to this aspect, it is possible to customize a GUI having a high use frequency, such as the setting operation regarding imaging, in the digital camera 10. As the imaging apparatus, any apparatus may be applied as long as the apparatus has an imaging function, such as a smartphone, in addition to the digital camera.

The evaluation value is the evaluation value with the number of erroneous operations as the evaluation item.

Here, the number of erroneous operations is the number of erroneous operations that are performed in the setting operation time. In the present example, the setting operation time is a total elapsed time from the start to the end of the setting operation (the setting operation time ts1 of FIG. 5). In regard to the evaluation value, the number of erroneous operations is used as the evaluation item, whereby it is easy to accurately evaluate whether or not a GUI is suitable for the operational feeling of the user as described above. As the number of erroneous operations is smaller, the evaluation value is set to be higher, whereby a GUI with a small number of erroneous operations is easily customized. The setting operation time for which the number of erroneous operations is counted is set to the setting operation time ts1 that is the total elapsed time for performing the setting operation as shown in FIG. 5. In this manner, since it is possible to count the number of erroneous operations for all the time pertaining to the setting operation, it is easy to appropriately evaluate the operational feeling of the user.

The evaluation value may be an evaluation value with the setting operation time as an evaluation item. In regard to the evaluation value in this case, for example, as the setting operation time is longer, the evaluation value is set to be lower, and as the setting operation time is shorter, the evaluation value is set to be higher. According to this aspect, a GUI on which the setting operation can be performed in a short time is easily customized. It is considered that a time is an important factor for which the user feels that operability is bad. For this reason, the setting operation time is used as the evaluation item, whereby it is easy to more appropriately evaluate the operational feeling of the user.

The evaluation value may be an evaluation value with the no-operation time tn shown in FIG. 5 as an evaluation item. The no-operation time tn can be regarded as a time for which the user places the finger FG on the GUI but is wavering over an operation of the GUI. In regard to the evaluation value in this case, as the no-operation time tn is longer, the evaluation value is set to be lower, and as the no-operation time tn is shorter, the evaluation value is set to be higher. According to this aspect, a GUI in which wavering is difficult to occur is easily customized.

In this way, as the evaluation item of the evaluation value, various evaluation items, such as the setting operation time, the no-operation time, and the number of erroneous operations, are considered. As described above, since usefulness for appropriately evaluating the operational feeling of the user is recognized in any of such evaluation items, at least one of such evaluation items may be included as the evaluation item of the evaluation value.

The setting operation time may be a total elapsed time from the start of the setting operation to a shutter button operation (a setting operation time ts2 of FIG. 18) as shown in FIG. 18, other than the example (setting operation time ts1) shown in FIG. 5. The setting operation time is set to the setting operation time ts2 shown in FIG. 18, whereby, in addition to the operations until the setting screen G is closed, it is also possible to count the number of erroneous operations in a period from returning of the setting screen G to the live view to completion of the operation of the shutter button 13. As in the present example, in a case where the setting operation is the setting operation regarding imaging, it can also be considered that the setting operation is performed for imaging, and it is important to easily perform a series of operations from the setting operation to imaging. For this reason, the setting operation time is set to the setting operation time ts2 shown in FIG. 18, whereby it is possible to reflect the series of operations from the setting operation to imaging in the evaluation value. As a result, it is possible to set a GUI having satisfactory operability on the series of operations from the setting operation to imaging.

The operation items include the stop, the shutter speed, and the imaging sensitivity. According to this aspect, it is possible to easily customize an operation item on which the setting operation is frequently performed in the digital camera 10, for each user.

Second Embodiment

Next, a second embodiment of the present disclosure will be described. In a digital camera 10 according to the second embodiment, the content of the GUI setting processing of Step S16 shown in FIG. 14 and the like is changed compared to the first embodiment. Specifically, the GUI setting processing is changed to Step SA16 shown in FIG. 19 instead of Step S16 of FIG. 14 and the like. Other kinds of processing are the same as in the first embodiment. The hardware configuration of the digital camera 10 is the same as in the first embodiment, and thus, description of the contents overlapping the first embodiment will not be repeated.

[Flow of Processing]

In the second embodiment, the whole processing will be described using the flowchart of FIG. 14 shown in the first embodiment as an example, and the content of the GUI setting processing of Step S16A different from the first embodiment will be described using the flowchart shown in FIG. 19.

As shown in FIG. 14, in a case where the setting button 14 is depressed in a state in which the live view is displayed on the touch panel 26 (in Step S10, determination is made to be Yes), first, the CPU 21 determines whether or not a setting operation is an initial setting operation after the digital camera 10 is powered on (Step S11).

In a case where, in Step S11, the setting operation is the initial setting operation after the digital camera 10 is powered on (in Step S11, determination is made to be Yes), the GUI presentation processing unit 21a executes the GUI presentation processing to display a setting screen on the touch panel 26 (Step S12).

Here, as an example, a case where the setting screen G1 of the rotational swipe operation type shown in FIG. 6 is set as the setting screen will be described. The digital camera 10 comprises the three operation items of the shutter speed, the stop, and the imaging sensitivity on the setting screen as an example. In the setting screen G1 of the rotational swipe operation type, the shutter speed setting button 30, the aperture stop setting button 31, and the imaging sensitivity setting button 32 for inputting the set values of the respective operation items are disposed in a row in this order from the left. An enter button 33 and a back button 34 are provided separately from such buttons.

Next, the evaluation value acquisition processing unit 21b starts the evaluation value acquisition processing on the GUI presented on the touch panel 26 as the setting screen (Step S13). Here, as an example, the evaluation value has the number of erroneous operations of the user with respect to the presented GUI as an evaluation item.

Next, in a case where an instruction to end the setting is input from the touch panel 26, the evaluation value acquisition processing unit 21b ends the display of the setting screen (Step S14), and ends the evaluation value acquisition processing (Step S15).

Figure 19:
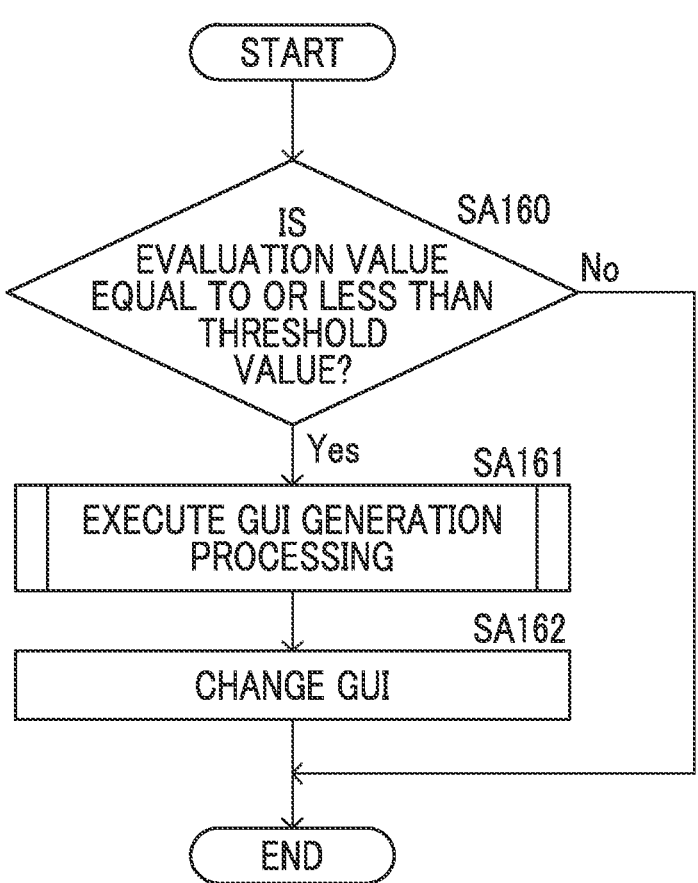
FIG. 19 is a flowchart illustrating details of GUI setting processing in a second embodiment.

Next, the GUI setting processing unit 21c executes the GUI setting processing shown in FIG. 19 (Step SA16).

In detail, as shown in FIG. 19, the GUI setting processing unit 21c first determines whether or not the evaluation value on the presented GUI is equal to or less than the threshold value (Step SA160). In a case where the evaluation value is equal to or less than the threshold value (in Step SA160, determination is made to be Yes), the GUI setting processing unit 21c executes GUI generation processing (Step SA161).

The GUI generation processing of Step SA161 is processing of generating a new GUI different from a GUI set in advance. In detail, as shown in FIG. 20, in Step SA161, the GUI setting processing unit 21c determines an operation item having a highest use frequency based on an operation history of the user (Step SA1610).

Figures 20, 21:
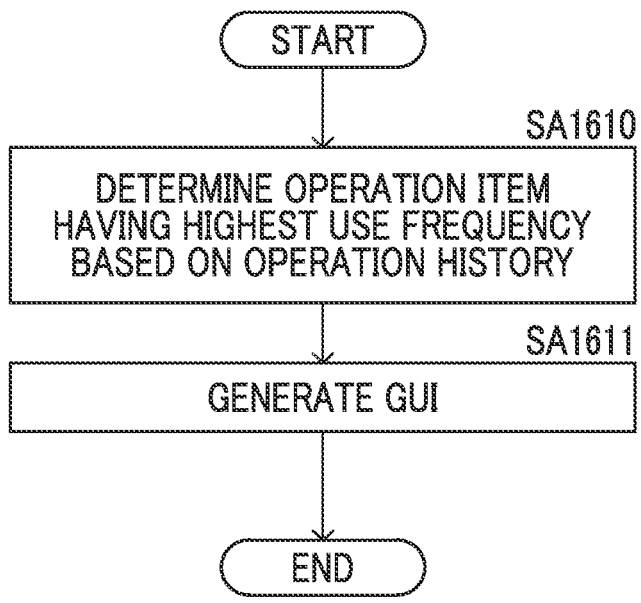
FIG. 20 is a flowchart illustrating details of GUI generation processing in the second embodiment.
FIG. 21 is a table showing the cumulative number of settings of each operation item.

Specifically, the GUI setting processing unit 21c records a cumulative number of settings from product shipment based on the operation history of the user on the three items of the shutter speed, the stop, and the imaging sensitivity as shown in a table of FIG. 21.

Then, in Step SA1610, the GUI setting processing unit 21c determines an operation item having a greatest cumulative number of settings as the operation item having the highest use frequency from the table of FIG. 21. Here, as an example, a case where the cumulative number of settings of the shutter speed is the greatest will be described.

Next, the GUI setting processing unit 21c disposes a GUI of the operation item having the highest use frequency at a position closest to the center of the screen and generates a new GUI (Step SA1611).

In regard to the generation of the new GUI, as an example, the shutter speed setting button 30 that is the GUI of the operation item having the highest use frequency is disposed at a position closest to the center of the screen in the currently set setting screen G1 of the rotational swipe operation type. The aperture stop setting button 31 and the imaging sensitivity setting button 32 are disposed on both sides of the shutter speed setting button 30.

Figure 22:
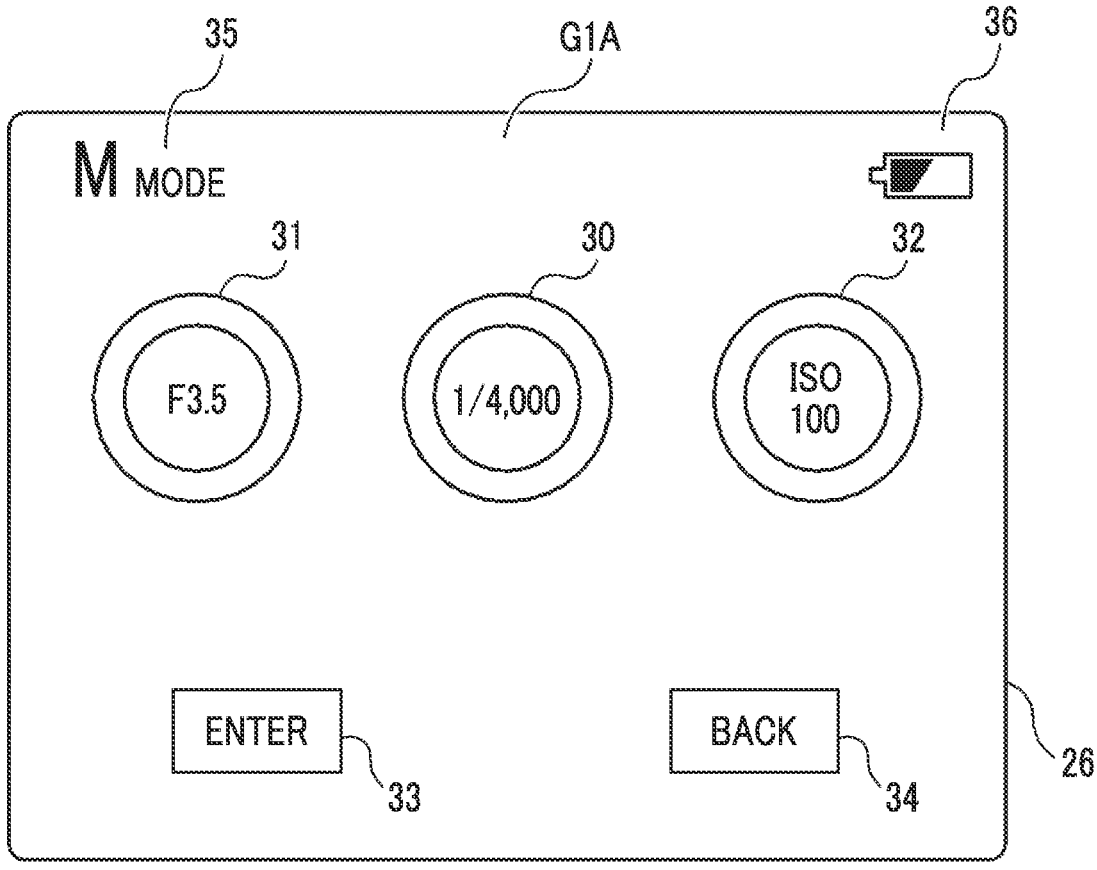
FIG. 22 is a diagram showing a modification example of a setting screen of a rotational swipe operation type.

In this manner, as shown in FIG. 22, a setting screen GIA of a rotational swipe operation type in which the aperture stop setting button 31, the shutter speed setting button 30, and the imaging sensitivity setting button 32 are disposed in a row in this order from the left is generated.

Returning to the flowchart of FIG. 19, next, the GUI setting processing unit 21c changes a GUI on display of a next setting screen to the GUI generated in Step SA161 (Step SA162), and proceeds to Step S19 of FIG. 14.

In a case where the evaluation value is greater than the threshold value in Step SA160 (in Step SA160, determination is made to be No), the GUI setting processing unit 21c does not generate a GUI, remains the original setting, and proceeds to Step S19 of FIG. 14.

Returning to the flowchart of FIG. 14, the CPU 21 repeats the processing of Steps S10 to S16 until the digital camera 10 is powered off (in Step S19, determination is made to be Yes). In this way, the processing other than the GUI setting processing of Step S16 is the same as in the first embodiment.

Operations and Effects

In the present embodiment, the CPU 21 executes the GUI generation processing of generating a new GUI different from a GUI set in advance and sets the generated GUI in the GUI setting processing. According to this aspect, even though data of a plurality of changeable setting screens G such as a plurality of setting screens G1 to G3 shown in the first embodiment, is not held in advance, it is possible to combine the individual components of the GUIs to present various GUI screens. For this reason, since it is possible to customize each of the individual components of the GUIs, it is easier to make a GUI approach a GUI of user's preference. In a case where data of the components of the GUIs are held, it is possible to generate various GUIs by various combinations of the components. For this reason, unlike a case where all kinds of data of a plurality of setting screens G are held, since all kinds of data of all of the GUIs may not be held, it is possible to present various GUIs while reducing a data storage capacity.

In the GUI generation processing, in a case of disposing GUIs of a plurality of operation items on one screen, the GUI setting processing unit 21*c* disposes a GUI of an operation item having a highest use frequency at a position closest to the center of the screen. According to this aspect, it is possible to set an easy-to-use GUI for the user.

Third Embodiment

Figure 23:
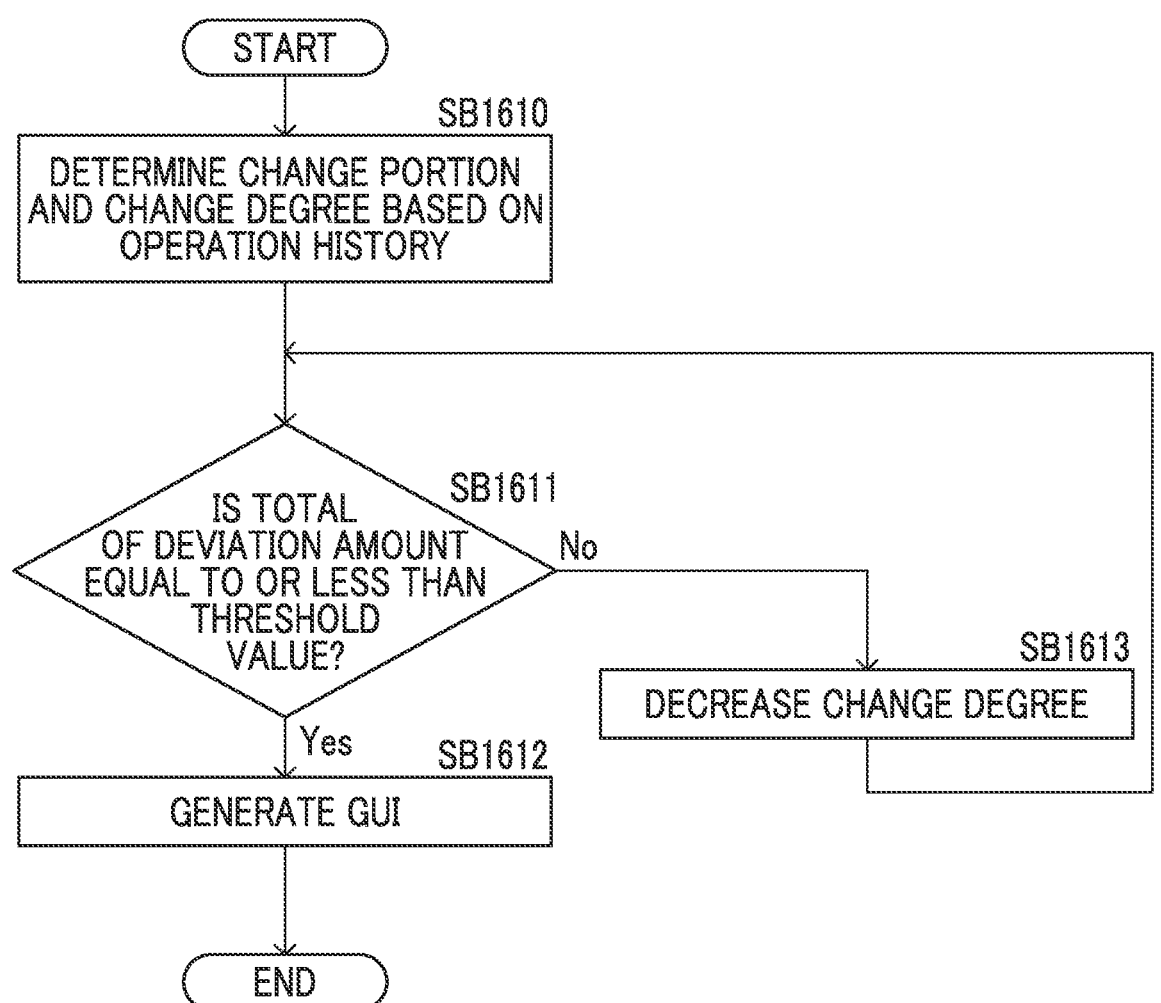
FIG. 23 is a flowchart illustrating details of GUI generation processing in a third embodiment.

Next, a third embodiment of the present disclosure will be described. In a digital camera 10 according to the third embodiment, the GUI generation processing is changed compared to the second embodiment. Specifically, in the third embodiment, Step SB161 shown in FIG. 23 is executed instead of Step SA161 shown in FIG. 20. Other kinds of processing are the same. The hardware configuration of the digital camera 10 is the same as in the second embodiment, and thus, description of the contents overlapping the second embodiment will not be repeated.

[Flow of Processing]

A flow of processing on GUI setting in the digital camera 10 will be described using a flowchart.

As shown in FIG. 14, in a case where the setting button 14 is depressed in a state in which the live view is displayed on the touch panel 26 (in Step S10, determination is made to be Yes), first, the CPU 21 determines whether or not a setting operation is an initial setting operation after the digital camera 10 is powered on (Step S11).

In a case where, in Step S11, the setting operation is the initial setting operation after the digital camera 10 is powered on (in Step S11, determination is made to be Yes), the GUI presentation processing unit 21*a* executes the GUI presentation processing to display a setting screen on the touch panel 26 (Step S12).

Here, as an example, a case where the setting screen G1 of the rotational swipe operation type shown in FIG. 6 is set as the setting screen G will be described. The digital camera 10 comprises the three operation items of the shutter speed, the stop, and the imaging sensitivity on the setting screen G as an example. In the setting screen G1 of the rotational swipe operation type, the shutter speed setting button 30, the aperture stop setting button 31, and the imaging sensitivity setting button 32 for inputting the set values of the respective operation items are disposed in a row in this order from the left. An enter button 33 and a back button 34 are provided separately from such buttons.

Next, the evaluation value acquisition processing unit 21*b* starts the evaluation value acquisition processing on the GUI presented to the touch panel 26 as the setting screen G (Step S13). Here, as an example, the evaluation value has the number of erroneous operations of the user with respect to the presented GUI as an evaluation item.

Next, in a case where an instruction to end the setting is input from the touch panel 26, the evaluation value acquisition processing unit 21*b* ends the display of the setting screen (Step S14), and ends the evaluation value acquisition processing (Step S15).

Next, the GUI setting processing unit 21*c* executes the GUI setting processing (Step S16).

In the GUI setting processing, in detail, as shown in FIG. 19, first, determination is performed whether or not the evaluation value on the presented GUI is equal to or less than the threshold value (Step SA160). Then, in a case where the evaluation value is equal to or less than the threshold value (in Step SA160, determination is made to be Yes), in the third embodiment, the GUI setting processing unit 21*c* executes the GUI generation processing of Step SB161 shown in FIG. 23 instead of Step SA161 shown in FIG. 20.

As shown in FIG. 23, in Step SB161, the GUI setting processing unit 21*c* determines a change portion and a change degree of the GUI based on an operation history of the user (Step SB1610).

In regard to the change portion of the GUI, as an example, as shown in a table of FIG. 24, a size, display chroma saturation, a swipe operation reaction amount, a tap operation identification time, a detection region displacement amount of each button can be changed for each button.

Priority is set to each item of the change portion. The priority is given in such a manner that an order is higher as a numeral is smaller. It is assumed that the priority indicates an order of a change portion to be changed with priority among the change portions. In the example of FIG. 24, the priority of the button size is the highest, and the priority of the detection region displacement amount is the lowest. The GUI setting processing unit 21*c* changes the change portions in order from the change portion with high priority in a case of changing the setting screen G in the GUI generation processing. For each item of the change portion, a deviation amount indicating a degree of deviation from a standard state depending on the change degree is digitized. The change degree is an index indicating a degree of changing the change portion. For example, the change degree of the button size is a degree of changing the magnitude of the button size, and as the change degree is greater in a positive direction, the button size is changed more largely.

The button size can be changed in a range of 1.1 times to 1.3 times in a direction of increasing the size and can be changed in a range of 0.9 times to 0.7 times in a direction of decreasing the size, with a size of a standard state as a reference. In regard to the deviation amount, the standard state is set to "0", the states of 1.1 times and 0.9 times are set to "1", the states of 1.2 times and 0.8 times are set to "2", and the states of 1.3 times and 0.7 times are set to "3". The priority of the button size is set to "1".

For the setting operation time ts1 (see FIG. 5) from the depression of the setting button 14 to the completion of the input of the instruction to end the setting from the touch panel 26, in a case where the no-operation time tn is long, it is considered that the user is difficult to identify the GUI. For this reason, in a case where the no-operation time tn is long, the GUI setting processing unit 21*c* performs change to increase the size of the button depending on a length of the no-operation time tn based on the operation history of the user. For the setting operation time ts1, in a case where the use frequency of the button is high, the GUI setting processing unit 21*c* changes the size of the button to increase depending on the use frequency. For the setting operation time ts1, in a case where the use frequency of the button is low, the GUI setting processing unit 21*c* performs change to decrease the size of the button depending on the use frequency.

The display chroma saturation is the chroma saturation of a display color of the change portion of the GUI, such as the button. The display chroma saturation can be changed to high and ultrahigh in a direction of increasing the chroma saturation, and can be changed to low and ultralow in a direction of decreasing the chroma saturation, with chroma saturation of a standard state as a reference. In regard to the deviation amount, the standard state is set to "0", the states of high and low are set to "1", and the states of ultrahigh and ultralow are set to "2". The priority of the button display chroma saturation is set to "2".

For the setting operation time ts1 from the depression of the setting button 14 to the completion of the input of the instruction to end the setting from the touch panel 26, in a case where the no-operation time tn is long, it is considered that the user is difficult to identify the GUI. For this reason, in a case where the no-operation time tn is long, the GUI setting processing unit 21c performs change to increase the display chroma saturation of the button depending on the length of the no-operation time tn based on the operation history of the user. For the setting operation time ts1, in a case where the use frequency of the button is high, the GUI setting processing unit 21c performs change to increase the display chroma saturation of the button depending on the use frequency. For the setting operation time ts1, in a case where the use frequency of the button is low, the GUI setting processing unit 21c performs change to decrease the display chroma saturation of the button depending on the use frequency.

In regard to a button for a swipe operation, the swipe operation reaction amount can be changed. The swipe operation reaction amount is a parameter indicating an amount in which the GUI setting processing unit 21c changes a set value with respect to a swipe operation amount of the finger FG of the user on the touch panel 26. The swipe operation reaction amount can be changed in a range of 1.1 times to 1.3 times in a direction of increasing the reaction amount and can be changed in a range of 0.9 times to 0.7 times in a direction of decreasing the reaction amount, with a reaction amount of a standard state as a reference. In regard to the deviation amount, the standard state is set to "0", the states of 1.1 times and 0.9 times are set to "1", the states of 1.2 times and 0.8 times are set to "2", and the states of 1.3 times and 0.7 times are set to "3". The priority of the swipe operation reaction amount is set to "3".

In a case where the user repeats a long swipe operation on the setting screen, it is considered that the sensitivity of the swipe operation is too low. Conversely, in a case where the user repeats a detailed swipe operation on the setting screen, it is considered that the sensitivity of the swipe operation is too high. For this reason, in a case where the user repeats a long swipe operation, the GUI setting processing unit 21c performs change to increase the swipe operation reaction amount depending on a length of the swipe operation. In a case where the user repeats a detailed swipe operation, the GUI setting processing unit 21c performs change to decrease the swipe operation reaction amount depending on the length of the swipe operation.

In regard to a button for a tap operation, the tap operation identification time can be changed. The tap operation identification time is a parameter indicating a length of a contact time of the finger FG with respect to the touch panel 26, for allowing the GUI setting processing unit 21c to identify a tap operation in a case where the user performs a tap operation with the finger FG. The tap operation identification time can be changed in a range of 1.1 times to 1.3 times in a direction of extending the identification time and can be changed in a range of 0.9 times to 0.7 times in a direction of reducing the identification time, with an identification time of a standard state as a reference. In regard to the deviation amount, the standard state is set to "0", the states of 1.1 times and 0.9 times are set to "1", the states of 1.2 times and 0.8 times are set to "2", and the states of 1.3 times and 0.7 times are set to "3". The priority of the tap operation identification time is set to "3".

In a case where the user tends to tap the button long, the GUI setting processing unit 21c performs change to extend the tap operation identification time depending on a length of the tap operation. In a case where the user tends to tap the button short, the GUI setting processing unit 21c performs change to reduce the tap operation identification time depending on the length of the tap operation.

The detection range displacement amount is a displacement amount of a detection region of a button operation on the touch panel 26 with respect to a display position of a button. Normally, a center position of the button is the same as a center position of the detection region. Note that, in a case where an operation position of the button of the user is constantly shifted in the same direction from the center position of the button, the center position of the detection region is displaced in a direction of the operation shift from the center position of the button. With this, even in a case where variation occurs in the operation position for each operation input of the user, it is possible to increase the accuracy of detection. The detection range displacement amount can be displaced in units of 20 pixels to 60 pixels in the direction of the operation shift with a position of a standard state as a reference. In regard to the deviation amount, the standard state is set to "0", the state of 20 pixels is set to "1", the state of 40 pixels is set to "2", and the state of 60 pixels is set to "3". The priority of the detection range displacement amount is set to "4".

The GUI setting processing unit 21c changes a displacement direction and a displacement amount depending on an average error between the center position of the button and the operation position of the button of the user.

The GUI setting processing unit 21c performs determination about the above-described components in a complex manner to determine the change portions and the change degrees of the GUI based on the operation history of the user on each button on the setting screen G1 of the rotational swipe operation type.

Next, the GUI setting processing unit 21c determines whether or not the total of the deviation amounts in the determined change portions and change degrees is equal to or less than a threshold value (Step SB1611). In a case where the total of the deviation amounts is equal to or less than the threshold value (in Step SB1611, determination is made to be Yes), the GUI setting processing unit 21c generates a new GUI based on the determined change portions and change degrees (Step SB1612).

In a case where the total of the deviation amounts exceeds the threshold value (in Step SB1611, determination is made to be No), the GUI setting processing unit 21c decreases the change degree by one stage in order from the change portion with low priority (Step SB1613), and performs the determination of Step SB1611 again. Such processing is repeated until the total of the deviation amounts is equal to or less than the threshold value.

Here, the processing of Steps SB1611, SB1612, and SB1613 will be described in detail in connection with a specific example.

It is assumed that the threshold value in Step SB1611 is set to "15". In Step SB1610, it is assumed that the GUI setting processing unit 21c determines the button size to 1.2 times (priority 1, deviation amount 2) and the button display chroma saturation to high (priority 2, deviation amount 1) on each of the shutter speed setting button 30, the aperture stop setting button 31, the imaging sensitivity setting button 32, the enter button 33, and the back button 34. It is assumed that the GUI setting processing unit 21c determines the tap operation identification time to 1.1 times (priority 3, deviation amount 1) on each of the enter button 33 and the back button 34.

Since the total of the deviation amounts in this case is "17", the processing of Steps SB1611 and Step SB1613 is repeated until the total of the deviation amounts is equal to or less than the threshold value (in this case, 15). Specifically, initially, the change degree of the tap operation identification time with lowest priority of the change portion is decreased by one stage (Step SB1613), and the determination of Step SB1611 is performed again.

Here, while the buttons where the tap operation identification time is changed are two buttons of the enter button 33 and the back button 34, a button of which the change degree is initially decreased can be appropriately set. For example, priority may be set for each button and the change degree may be decreased from a button with low priority, or the change degree may be decreased from a button at a position farther from the center of the screen.

As a result of repeating the processing of Steps SB1611 and SB1613, the total of the deviation amounts is "15" at a point of time at which the button size is determined to 1.2 times (priority 1, deviation amount 2) and the button display chroma saturation is determined to high (priority 2, deviation amount 1) on each of the shutter speed setting button 30, the aperture stop setting button 31, the imaging sensitivity setting button 32, the enter button 33, and the back button 34, and the GUI setting processing unit 21c proceeds from Step SB1611 to Step SB1612.

Figure 25:
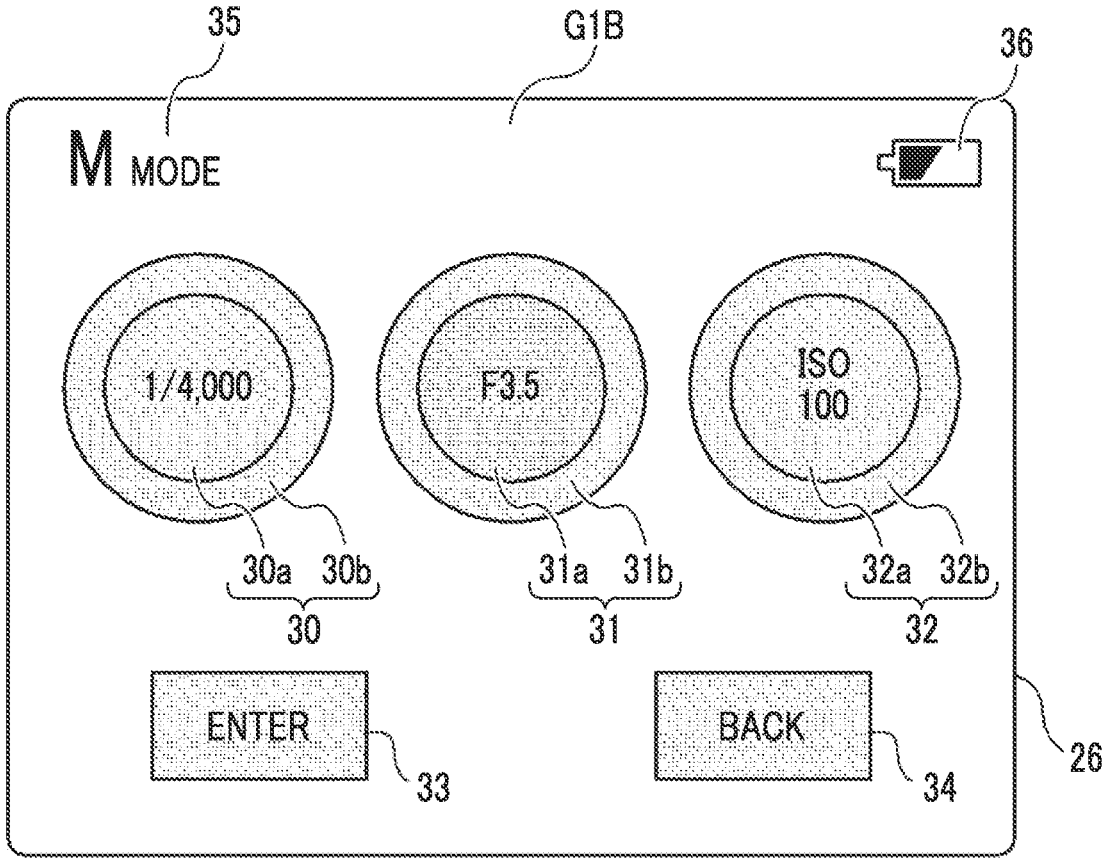
FIG. 25 is a diagram showing a modification example of a setting screen of a rotational swipe operation type.

The GUI setting processing unit 21c generates a setting screen G1B of a rotational swipe operation type as a new GUI based on the change portions and the change degrees finally determined in the above-described manner as shown in FIG. 25 (Step SB1612).

Returning to the flowchart of FIG. 19, next, the GUI setting processing unit 21c changes a GUI on display of a next setting screen to the GUI generated in Step SB161 (Step SA162), and proceeds to Step S19 of FIG. 14.

In a case where the evaluation value is greater than the threshold value in Step SA160 (in Step SA160, determination is made to be No), the GUI setting processing unit 21c does not generate a GUI, remains the original setting, and proceeds to Step S19 of FIG. 14.

Returning to the flowchart of FIG. 14, the CPU 21 repeats the processing of Steps S10 to S16 until the digital camera 10 is powered off (in Step S19, determination is made to be Yes). In this way, the processing other than the GUI setting processing of Step S16 is the same as in the first embodiment.

Operations and Effects

In the present embodiment, the CPU 21 digitizes the deviation amount indicating the degree of deviation of the changed state from the set standard state on each of the changeable components of the GUI and generates the new GUI in a range in which the total of the deviation amounts falls within a determined numerical range, in the GUI generation processing. According to this aspect, it is possible to restrain a GUI from being a hard-to-use GUI due to excessive deviation from the standard state.

Fourth Embodiment

Next, a fourth embodiment of the present disclosure will be described. In a digital camera 10 according to the fourth embodiment, a difference from the first embodiment is that the GUI setting processing is changed from the first GUI setting mode to a second GUI setting mode. As described above, the first GUI setting mode is a mode where one GUI is presented, and in a case where the evaluation value on the presented GUI is equal to or less than the set threshold value, the presented GUI is changed to another GUI. In contrast, the second GUI setting mode is a mode where a plurality of kinds of GUIs on the same operation item are presented, and in a case where the evaluation value of each of a plurality of kinds of presented GUIs is acquired in the evaluation value acquisition processing, a GUI having a relatively high evaluation value is set. The hardware configuration of the digital camera 10 is the same as in the first embodiment, and thus, description of the contents overlapping the first embodiment will not be repeated.

In the fourth embodiment, the GUI presentation processing unit 21a selectively presents, for example, three kinds of setting screens G of the setting screen G1 of the rotational swipe operation type, the setting screen G2 of the tap operation type, and the setting screen G3 of the vertical swipe operation type. The GUI presentation processing unit 21a switches and displays the three kinds of setting screens G1 to G3 in a case where a set switching condition is satisfied. The switching condition is, for example, a time or the number of starts of the digital camera 10. For example, the GUI presentation processing unit 21a determines that the switching condition is satisfied in a case where a set time has elapsed after one setting screen G1 is presented, and switches the setting screen G1 to another setting screen G2. Alternatively, the GUI presentation processing unit 21a determines that the switching condition is satisfied in a case where the number of starts reaches the set number of times after one setting screen G1 is presented, and switches the setting screen G1 to another setting screen G2.

Then, in a case where each of the setting screens G1 to G3 is presented, the evaluation value acquisition processing unit 21b acquires the evaluation value of each setting screen. The evaluation value acquired in this manner is recorded in the memory 22.

Figure 26:
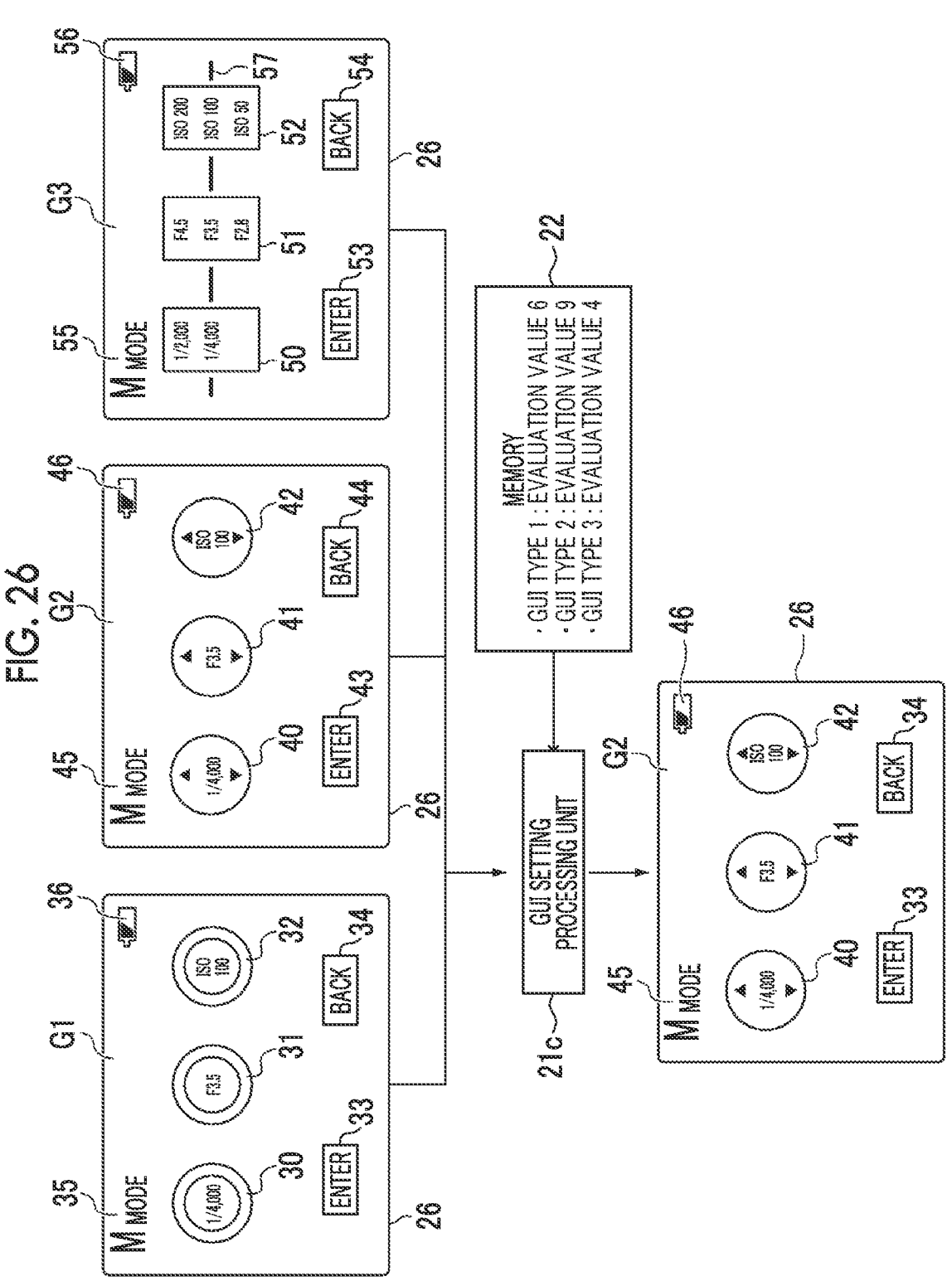
FIG. 26 is a diagram illustrating processing contents of a GUI setting processing unit in a fourth embodiment.

After the presentation of a plurality of kinds of setting screens G1 to G3 and the acquisition of the evaluation values ends, as shown in FIG. 26, the GUI setting processing unit 21c executes GUI setting processing in the second GUI setting mode.

As shown in FIG. 26, the GUI setting processing unit 21c first reads out the evaluation value of each of the setting screens G1 to G3 acquired by the evaluation value acquisition processing unit 21b from the memory 22 in the GUI setting processing. Then, the GUI setting processing unit 21c selects the setting screen G having a relatively high evaluation value and sets the selected setting screen G as a GUI for use in the setting operation.

In the example of FIG. 26, since the evaluation value of the setting screen G2 of the tap operation type among the setting screen G1 of the rotational swipe operation type, the setting screen G2 of the tap operation type, and the setting screen G3 of the vertical swipe operation type is the highest, the setting screen G2 of the tap operation type is set.

[Flow of Processing]

A flow of processing on GUI setting in the digital camera 10 will be described using a flowchart.

Figure 27:
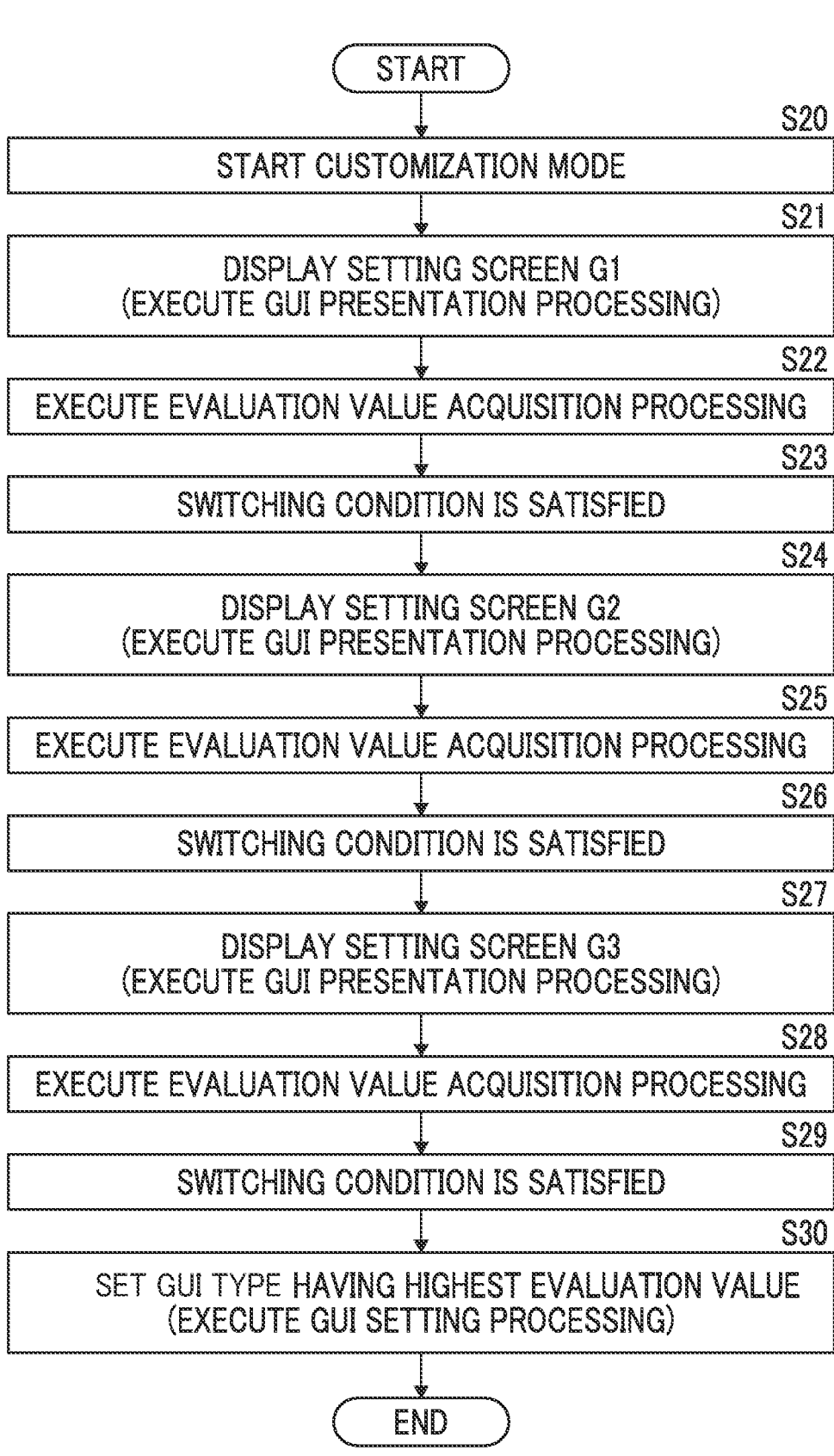
FIG. 27 is a flowchart illustrating processing on GUI setting in the fourth embodiment.

As shown in FIG. 27, in a case where an instruction to start a customization mode is input from the user (Step S20), the GUI presentation processing unit 21a initially sets the setting screen G1 of the rotational swipe operation type as a GUI type 1, and displays the setting screen G1 of the rotational swipe operation type on the touch panel 26 in a case where the setting button 14 is depressed (Step S21).

Next, the evaluation value acquisition processing unit 21*b* executes the evaluation value acquisition processing on the GUI presented on the touch panel 26 as the setting screen G (Step S22). Steps S21 and S22 are performed only once during the start of the digital camera 10.

Thereafter, in a case where it is detected that the switching condition is satisfied (Step S23), the GUI presentation processing unit 21*a* next sets the setting screen G2 of the tap operation type as a GUI type 2, and displays the setting screen G2 of the tap operation type as the setting screen on the touch panel 26 in a case where the setting button 14 is depressed (Step S24). In the present example, in a case where the digital camera 10 is restarted once after one setting screen G is presented, determination is made that the switching condition is satisfied, and the setting screen G is switched to another setting screen G.

Next, the evaluation value acquisition processing unit 21*b* executes the evaluation value acquisition processing on the GUI presented on the touch panel 26 as the setting screen (Step S25). Steps S24 and S25 are performed only once during the start of the digital camera 10.

Thereafter, in a case where it is detected that the switching condition is satisfied (Step S26), the GUI presentation processing unit 21*a* next sets the setting screen G3 of the vertical swipe operation type as a GUI type 3, and displays the setting screen G3 of the vertical swipe operation type as the setting screen on the touch panel 26 in a case where the setting button 14 is depressed (Step S27).

Next, the evaluation value acquisition processing unit 21*b* executes the evaluation value acquisition processing on the GUI presented on the touch panel 26 as the setting screen (Step S28). Steps S27 and Step S28 are performed only once during the start of the digital camera 10.

Thereafter, in a case where it is detected that the switching condition is satisfied (Step S29), the GUI setting processing unit 21*c* sets the GUI type having a relatively high evaluation value based on the evaluation value of each of a plurality of kinds of presented GUI types (Step S30), and ends the processing.

Operations and Effects

In the present embodiment, the CPU 21 sets the GUI in the second GUI setting mode where a plurality of kinds of GUIs on the same operation item are presented, and in a case where the evaluation value of each of a plurality of kinds of presented GUIs is acquired in the evaluation value acquisition processing, the GUI having a relatively high evaluation value is set, in the GUI setting processing. According to this aspect, it is possible to set a GUI that provides high satisfaction to the user.

Fifth Embodiment

Figure 28:
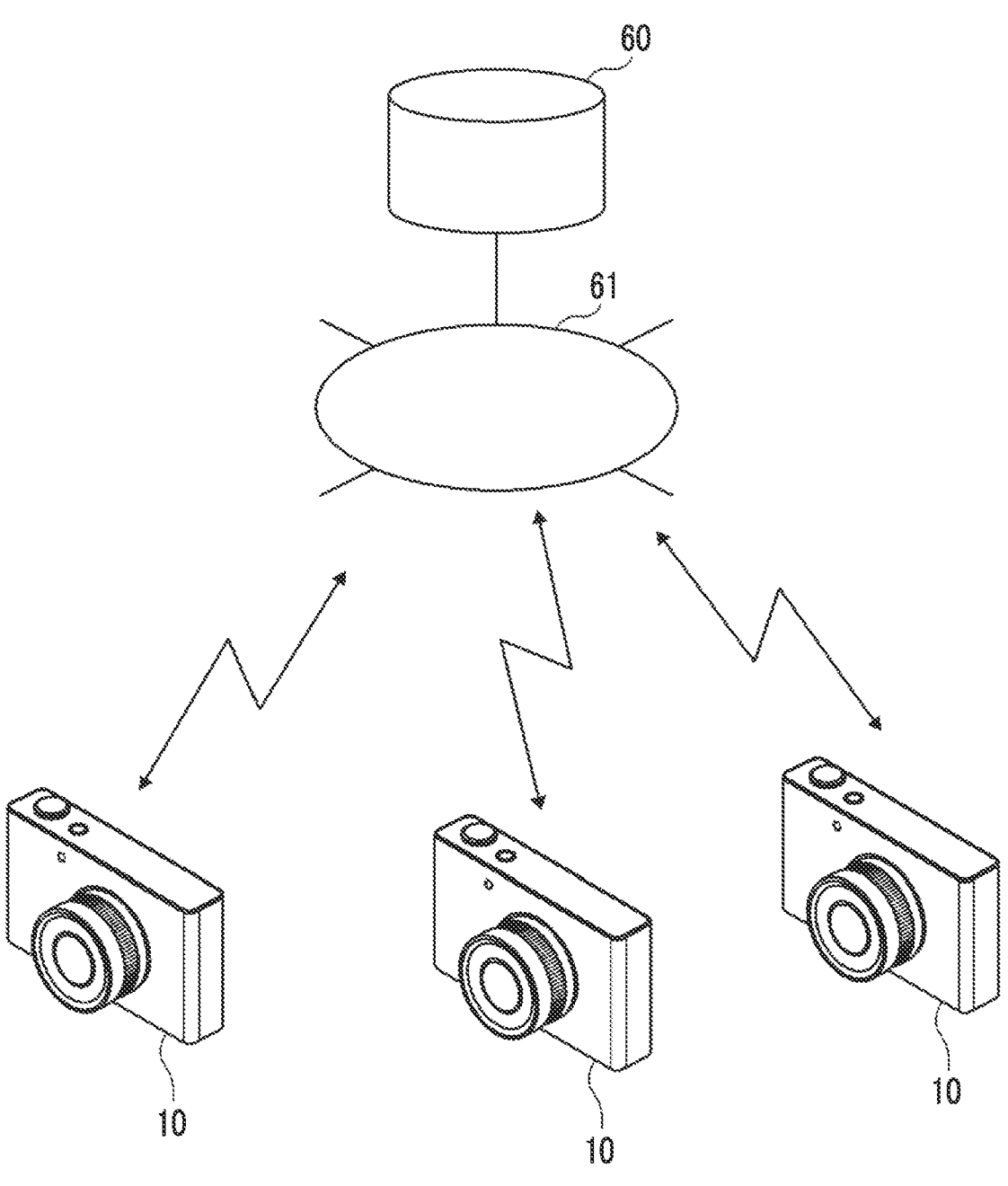
FIG. 28 is a configuration diagram of a GUI setting system including a digital camera of a fifth embodiment.

Next, a fifth embodiment of the present disclosure will be described. As shown in FIG. 28, in a digital camera 10 according to the fifth embodiment, a difference from the second embodiment is that GUI generation processing is executed based on GUI data acquired from an external server 60 through a network 61. The hardware configuration of the digital camera 10 is the same as in the first embodiment and the second embodiment, and thus, description of the contents overlapping the first embodiment and the second embodiment will not be repeated.

Figure 29:
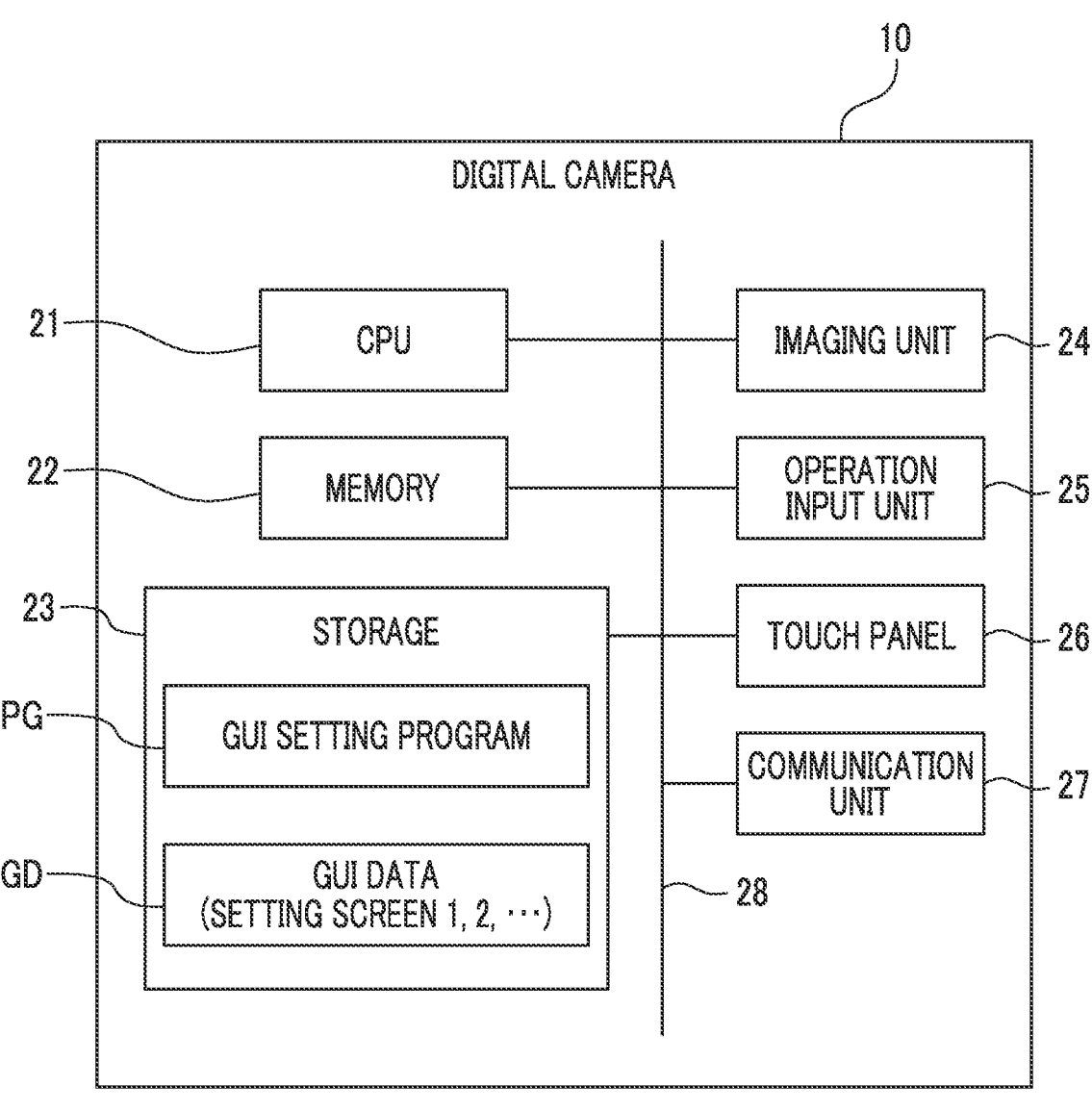
FIG. 29 is a block diagram showing a hardware configuration of the digital camera.

As shown in FIG. 29, the digital camera 10 has the CPU 21, the memory 22, the storage 23, the imaging unit 24, the operation input unit 25, the touch panel 26, and a communication unit 27. The respective configurations are connected to be communicable with each other through a bus 28.

The communication unit 27 is an interface through which a smartphone communicates with an external apparatus, such as the server 60, and for example, a standard, such as Wi-Fi (Registered Trademark) and Bluetooth (Registered Trademark), is used. The communication unit 27 is an example of a GUI data acquisition unit in the technique of the present disclosure.

The CPU 21 acquires GUI data from the external server 60 through the communication unit 27 and stores the acquired GUI data in the storage 23.

The CPU 21 may generate a new GUI based on the GUI data acquired from the external server 60 in the GUI generation processing.

According to this aspect, since it is possible to add GUI data necessary for generating a GUI later, it is possible to increase variation of GUIs that are presented to the user.

The acquisition of the GUI data from the outside is not limited to an aspect where the GUI data is acquired from the server 60 separated from the digital camera 10 as described above, and GUI data may be acquired by reading GUI data recorded on a medium, such as a memory card, in the digital camera 10.

A form of GUI data may be a form including only data of the components of the setting screen G or may be a form including a GUI generation program in addition to data of the components. In a case of the form including the GUI generation program, even in a case where the GUI generation program is not installed on the digital camera 10 in advance, a GUI can be generated in a case where GUI data is downloaded from the server 60.

Sixth Embodiment

Next, a sixth embodiment of the present disclosure will be described. As shown in FIG. 28, a GUI setting system 1 comprises the server 60, and the digital cameras 10.

In the GUI setting system 1, the server 60 acquires operation information of the user from the digital camera 10 and executes evaluation value acquisition processing and GUI setting processing based on the acquired operation information to change the GUI of the digital camera 10. The server 60 is an example of a GUI setting apparatus in the technique of the present disclosure. The digital camera 10 is an example of an electronic apparatus in the technique of the present disclosure.

The hardware configuration of the digital camera 10 is the same as in the fifth embodiment, and thus, description of the contents overlapping the fifth embodiment will not be repeated.

In the digital camera 10, the GUI can present setting screens G of three kinds of operation types of the setting screen G1 of the rotational swipe operation type, the setting screen G2 of the tap operation type, and the setting screen G3 of the vertical swipe operation type as an example. GUI data GD necessary for displaying such GUIs is stored in the storage 23.

Figure 30:
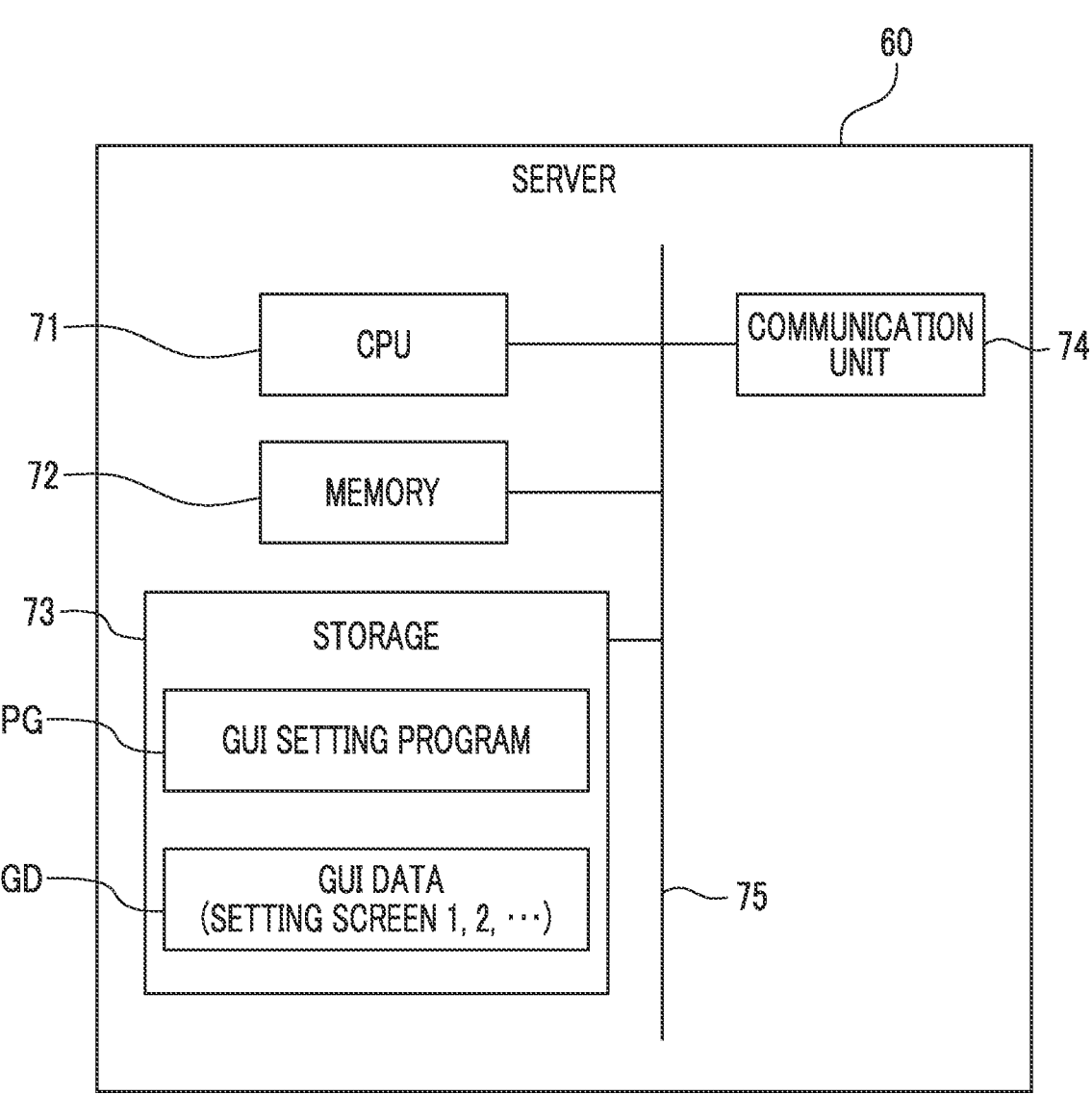
FIG. 30 is a block diagram showing a hardware configuration of a server of a sixth embodiment.

As shown in FIG. 30, the server 60 has a CPU 71, a memory 72, a storage 73, and a communication unit 74. The respective configurations are connected to be communicable with each other through a bus 75.

The CPU 71 integrally controls each unit of the server 60 by executing a control program and the like. The memory 72 is a work memory, and is configured with, for example, a RAM. The CPU 71 reads out the control program from the storage 73 to the memory 72 and executes the control program with the memory 72 as a work area. The CPU 71 performs control of each configuration described above and various kinds of processing following the control program.

The CPU 71 is an example of a processor in the technique of the present disclosure. The memory 72 is an example of a memory in the technique of the present disclosure. The server 60 comprising the CPU 71 and the memory 72 also functions as a GUI setting apparatus in the technique of the present disclosure.

The CPU 71 acquires an evaluation value from the digital camera 10 through the communication unit 74 in the evaluation value acquisition processing. The evaluation value that is acquired from the digital camera 10 may be the evaluation value itself or the evaluation value itself may not be included and operation information of the user necessary for deriving the evaluation value may be used.

In the present embodiment, the CPU 71 acquires the operation information of the user from the digital camera 10, and the evaluation value is derived and acquired in the CPU 71. A method of the evaluation value acquisition processing in the CPU 71 is the same as in the CPU 21 of the digital camera 10 in the first embodiment (see FIG. 12).

A method of the GUI setting processing in the CPU 71 is the same as in the CPU 21 of the digital camera 10 in the first embodiment (see FIG. 13).

The storage 73 stores various programs, such as the control program including an operating system and application programs, and various kinds of data including GUI data. The storage 73 is configured with, for example, a drive, such as a hard disk drive (HDD) or a solid state drive (SSD). In the present embodiment, a GUI setting program PG is stored as one of various programs in the storage 73.

The communication unit 74 is an interface through which the server 60 communicates with an external apparatus, such as the digital camera 10, and for example, a standard, such as Ethernet (Registered Trademark), a fiber distributed data interface (FDDI), and Wi-Fi (Registered Trademark), is used.

[Flow of Processing]

A flow of processing on GUI setting in the GUI setting system 1 will be described using a flowchart.

Figure 31:
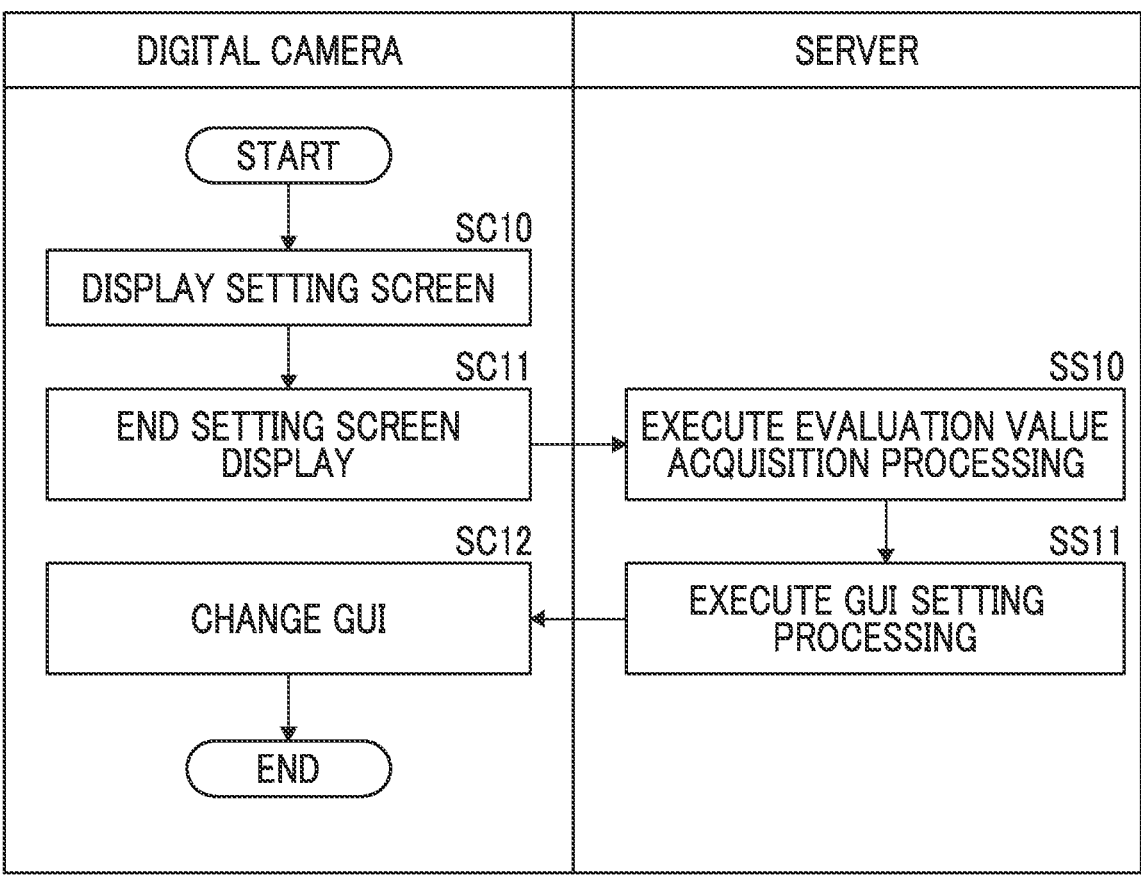
FIG. 31 is a flowchart illustrating processing on GUI setting in the GUI setting system.

As shown in FIG. 31, in a case where the setting button 14 is depressed in a state in which the live view is displayed on the touch panel 26, the CPU 21 of the digital camera 10 displays the setting screen on the touch panel 26 (Step SC10).

As the setting screen, the setting screen G of the currently set GUI type among the setting screen G1 of the rotational swipe operation type, the setting screen G2 of the tap operation type, and the setting screen G3 of the vertical swipe operation type is presented. In the initial setting of the digital camera 10, the setting screen G1 of the rotational swipe operation type is set.

In a case where an instruction to end the setting is input from the touch panel 26, the CPU 21 ends the display of the setting screen, and transmits classification information of the setting screen G of the operation type displayed on the setting screen and the operation information of the user performed during the display of the setting screen to the server 60 (Step SC11).

In a case where the classification information of the setting screen G of the operation type and the operation information of the user performed during the display of the setting screen are acquired from the digital camera 10, the CPU 71 of the server 60 executes the evaluation value acquisition processing (Step SS10). Next, the CPU 71 executes the GUI setting processing and transmits the classification information of the setting screen G of the operation type of the set GUI to the digital camera 10 (Step SS11).

For example, it is assumed that, in the digital camera 10, the setting screen G1 of the rotational swipe operation type is displayed as the GUI. In this case, in a case where the evaluation value is equal to or less than the threshold value, and there are a lot of erroneous operations of the tap operation on the contents of the erroneous operations at this moment, the CPU 71 performs change to the setting screen G2 of the tap operation type instead of the setting screen G1 of the rotational swipe operation type, and transmits information indicating the change to the digital camera 10.

In a case where the classification information of the setting screen G of the operation type is acquired from the server 60, the CPU 21 of the digital camera 10 changes the GUI to the GUI indicated by the classification information (Step SC12), and ends the processing. The changed GUI is reflected on display of a next setting screen G.

Operations and Effects

In the present embodiment, the server 60 that is an example of a GUI setting apparatus the communication unit 74 that performs communication with the digital camera 10, and the CPU 71 acquires the evaluation value from the digital camera 10 through the communication unit 74 in the evaluation value acquisition processing and sets the GUI of the digital camera 10 based on the evaluation value in the GUI setting processing.

According to this aspect, it is possible to perform the setting of the GUIs of a plurality of digital cameras 10 using one server 60.

Seventh Embodiment

Next, a seventh embodiment of the present disclosure will be described. A GUI setting system 1 of the present embodiment acquires a plurality of evaluation values on the GUI of the same operation item from a plurality of respective digital cameras 10, and the GUI of the digital camera 10 selected as a setting target is set based on a plurality of evaluation values in the GUI setting processing in the server 60. The hardware configuration of the GUI setting system 1 is the same as in the sixth embodiment, and thus, description of the contents overlapping the sixth embodiment will not be repeated.

The CPU 71 of the server 60 executes GUI setting processing for a plurality of digital cameras 10 as described in the sixth embodiment. As shown in a table of FIG. 32, the CPU 71 gives a camera ID to each of a plurality of digital cameras 10 and records and manages the evaluation value for each classification of the setting screen G of the operation type.

The CPU 71 can set the GUI of the digital camera 10 selected as a setting target based on the evaluation values acquired from a plurality of digital cameras 10 in the GUI setting processing.

For example, the classification of the setting screen of the operation type having a highest average of the evaluation value among a plurality of digital cameras 10 can be set as the GUI of the digital camera 10 selected as a setting target.

In an example of the table of FIG. 32, since the average of the evaluation value of the setting screen of the tap operation type among a plurality of digital cameras 10 is the highest, the setting screen of the tap operation type can be set as the GUI of the digital camera 10 selected as a setting target.

According to this aspect, since the GUI is set based on a plurality of evaluation values of the respective users on the GUI of the same operation item, it is possible to reflect the operational feelings of a plurality of users in GUI setting.

In a case where a new digital camera 10 is connected to the server 60, the CPU 71 may determine a GUI set based on the evaluation values previously acquired from a plurality of digital cameras 10 as described above, as a GUI of initial setting of the new digital camera 10. According to this aspect, it is possible to display a GUI reflecting the operational feelings of a lot of users in the initial state of the digital camera 10.

MODIFICATION EXAMPLES

Although the present disclosure has been described based on the preferred embodiments above, embodiments to which the present disclosure can be applied are not limited to the above-described embodiments.

For example, in the above-described embodiments, although the evaluation value acquisition processing and the GUI setting processing are executed based on the program that executes processing based on the determined routine, the methods of the evaluation value acquisition processing and the GUI setting processing are not limited to the above-described aspect. For example, in regard to the GUI setting processing, processing may be used using a machine learning model. The evaluation value acquisition processing and the GUI setting processing may be combined, and processing may be executed using a machine learning model.

For example, a machine learning model that has a plurality of evaluation values regarding the evaluation items, such as the setting operation time, the no-operation time, and the number of erroneous operations as inputs, and outputs a GUI, such as a setting screen G suitable for the operational feeling of the user depending on a combination of the evaluation values is used. The evaluation value is acquired for one GUI that is used by the user, and another GUI is newly set depending on the acquired evaluation value. Then, the acquisition of the evaluation value and the setting of another GUI are repeated with respect to the newly set GUI again. The machine learning model may be trained with an evaluation value acquired in a case where the user actually uses the GUI, as training data. In a case where the server is used as the GUI setting apparatus, since the evaluation values of a plurality of users can be collected, the number of pieces of training data also increases. With this, as the training data increases, training of the machine learning model is advanced. As the machine learning model, for example, a machine learning model described in JP4929449B can be used.

A display screen of the GUI is not limited to the above-described setting screen, and any screen may be applied. For example, in regard to the operation items, items other than the stop, the shutter speed, and the imaging sensitivity may be included. The live view and the setting screen may be disposed in parallel within one screen or may be displayed to overlap each other.

The electronic apparatus in the technique of the present disclosure is not limited to a digital camera, and may be, for example, other electronic apparatuses, such as a smartphone.

In the respective embodiments described above, the processing that is executed by the CPU 21 and the CPU 71 reading software (program) may be executed by various processors other than a CPU. Examples of the processors in this case include a programmable logic device (PLD) capable of changing a circuit configuration after manufacture, such as a field programmable gate array (FPGA), and a dedicated electric circuit that has a circuit configuration dedicatedly designed for executing specific processing, such as an application specific integrated circuit (ASIC). The respective processing may be executed by one of various processors or may be executed by a combination of two or more processors (for example, a plurality of FPGAs or a combination of a CPU and an FPGA) of the same type or different types. The hardware structure of various processors is more specifically an electric circuit (circuitry), in which circuit elements, such as semiconductor elements, are combined.

In the respective embodiments described above, although an aspect where the GUI setting program is stored (installed) in the storage 23 or the storage 73 in advance has been described, the technique of the present disclosure is not limited thereto. The program may be provided in a form of being recorded on a recording medium, such as a compact disc read only memory (CD-ROM), a digital versatile disc read only memory (DVD-ROM), and a universal serial bus (USB) memory. Alternatively, a configuration in which the program is downloaded from an external apparatus through a network may be used.

The ROM is a broad concept including a flash memory, an erasable programmable read only memory (EPROM), or an electrically erasable programmable read only memory (EE-PROM) that is a rewritable ROM.

The content of the above description and the content of the drawings are detailed description of portions according to the technique of the present disclosure, and are merely examples of the technique of the present disclosure. For example, the above description relating to configuration, function, operation, and advantageous effects is description relating to examples of configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

All of the documents, patent applications, and technical standards in the specification are incorporated herein by reference to the same extent that the individual documents, patent applications, and technical standards are described specifically and independently.

What is claimed is:

1. A GUI setting apparatus, comprising:
at least one processor; and
a memory incorporated in or coupled to the processor, wherein, the processor is configured to execute:

GUI presentation processing of presenting a GUI for operating an electronic apparatus, evaluation value acquisition processing of acquiring an evaluation value for evaluating an operational feeling of a user with respect to the presented GUI, GUI setting processing of performing setting to change the presented GUI to a different GUI based on the evaluation value, and transmission processing of transmitting, to the electronic apparatus, information of the different GUI as information of a GUI to be presented next, and wherein the processor is configured to:

determine whether or not a setting operation is an initial setting operation after the electronic apparatus has been turned on, and in a case in which it is determined that the setting operation is not an initial setting operation after the electronic apparatus has been turned on, the GUI presentation processing presents the GUI for operating the electronic apparatus based on the information of the different GUI changed by the GUI setting processing.

2. The GUI setting apparatus according to claim 1, wherein:

the GUI setting processing has at least one of a first GUI setting mode or a second GUI setting mode, the first GUI setting mode is a mode where a presented GUI is changed to another GUI in a case where the evaluation value is equal to or less than a set threshold value, and the second GUI setting mode is a mode where a plurality of kinds of GUIs for the same operation item are presented, and in a case where the evaluation values of the plurality of kinds of presented GUI are acquired in the evaluation value acquisition processing, a GUI of which the evaluation value is relatively high is set.

3. The GUI setting apparatus according to claim 1, wherein the evaluation value includes an evaluation value with the number of erroneous operations of the user with respect to a presented GUI as an evaluation item.

4. The GUI setting apparatus according to claim 3, wherein the processor is configured to:

execute a first GUI setting mode where the presented GUI is changed to another GUI in a case where the evaluation value is equal to or less than a set threshold value in the GUI setting processing; and perform change to a GUI suitable for a content of the erroneous operation of the user instead of the presented GUI in a case where the number of erroneous operations exceeds the set number of times and the evaluation value is equal to or less than the set threshold value.

5. The GUI setting apparatus according to claim 1, wherein the processor is configured to change at least one component of a display form of a graphic element, an operation method of the graphic element, operation sensitivity of the graphic element, an order of screen transition, or a time of the screen transition of the GUI in the GUI setting processing.

6. The GUI setting apparatus according to claim 1, wherein the processor is configured to execute a series of processing including GUI presentation processing of presenting the GUI, the evaluation value acquisition processing, and the GUI setting processing at a set timing.

7. The GUI setting apparatus according to claim 6, wherein the series of processing is repeatedly executed at the set timing.

8. The GUI setting apparatus according to claim 1 wherein the processor is configured to execute GUI generation processing of generating a new GUI different from a GUI set in advance and set the generated GUI in the GUI setting processing.

9. The GUI setting apparatus according to claim 8, further comprising a GUI data acquisition unit that acquires GUI data necessary for generating the new GUI, wherein the processor is configured to execute the GUI generation processing based on the GUI data.

10. The GUI setting apparatus according to claim 8, wherein the processor is configured to digitize a deviation amount indicating a degree of deviation of a changed state of a changeable component of the GUI from a set standard state and generate the new GUI in a range in which a total of the deviation amount falls within a determined numerical range in the GUI generation processing.

11. The GUI setting apparatus according to claim 8, wherein the processor is configured to dispose, in a case of disposing GUIs of a plurality of operation items on one screen in the GUI generation processing, the GUI of an operation item having a highest use frequency at a position closest to a center of the screen.

12. The GUI setting apparatus according to claim 1, wherein:

the GUI is a GUI that is used in an imaging apparatus, and an operation item is an operation item of a setting operation regarding imaging.

13. The GUI setting apparatus according to claim 12, wherein:

the evaluation value is an evaluation value with at least one of a setting operation time, a no-operation time, or the number of erroneous operations as an evaluation item, the setting operation time is a total elapsed time from a start to an end of the setting operation or from the start of the setting operation to a shutter button operation, the no-operation time is a noncontact time for which the user is not in contact with the GUI, in the setting operation time, and the number of erroneous operations is the number of erroneous operations that are performed in the setting operation time.

14. The GUI setting apparatus according to claim 12, wherein the operation item includes at least one of a stop, a shutter speed, or imaging sensitivity.

15. The GUI setting apparatus according to claim 1, further comprising a communication unit that performs communication with the electronic apparatus, wherein the processor is configured to:

acquire the evaluation value from the electronic apparatus through the communication unit in the evaluation value acquisition processing; and set the GUI of the electronic apparatus based on the evaluation value in the GUI setting processing.

16. The GUI setting apparatus according to claim 15, wherein the processor is configured to:

acquire a plurality of the evaluation values of the GUI of the same operation item from each of a plurality of the electronic apparatuses in the evaluation value acquisition processing; and set a GUI of an electronic apparatus selected as a setting target based on the plurality of evaluation values in the GUI setting processing.

17. The GUI setting apparatus according to claim 16, wherein the processor is configured to determine the GUI of initial setting of the electronic apparatus based on the plurality of evaluation values.

18. The GUI setting apparatus according to claim 1, wherein the information of the GUI is information regarding a display form of a graphic element or an operation method of a graphic element of the electronic apparatus each own by user.

19. The GUI setting apparatus according to claim 1, wherein the information of GUI is information regarding a display form of at least one of operation sensitivity of a graphic element, an order of screen transition, or a time of screen transition, in the GUI.

20. The GUI setting apparatus according to claim 1, wherein the GUI presentation processing includes displaying a setting screen of the electronic apparatus based on the information of the changed different GUI.

21. A GUI setting method, comprising:

executing GUI presentation processing of presenting a GUI for operating an electronic apparatus, executing evaluation value acquisition processing of acquiring an evaluation value for evaluating an operational feeling of a user with respect to the presented GUI, executing GUI setting processing of performing setting to change the presented GUI to a different GUI based on the evaluation value, and executing transmission processing of transmitting, to the electronic apparatus, information of the different GUI as information of a GUI to be presented next, wherein the GUI setting method further comprises determining whether or not a setting operation is an initial setting operation after the electronic apparatus has been turned on, and in a case in which it is determined that the setting operation is not an initial setting operation after the electronic apparatus has been turned on, the GUI presentation processing presents the GUI for operating the electronic apparatus based on the information of the different GUI changed by the GUI setting processing.

22. A non-transitory computer readable medium storing a GUI setting program that causes a computer to execute:

GUI presentation processing of presenting a GUI for operating an electronic apparatus, evaluation value acquisition processing of acquiring an evaluation value for evaluating an operational feeling of a user with respect to the presented GUI, GUI setting processing of setting to change the presented GUI to a different GUI based on the evaluation value, and transmission processing of transmitting, to the electronic apparatus, information of the different GUI as information of GUI to be next presented, wherein the evaluation value is an evaluation value with at least one of a setting operation time, a no-operation time, or the number of erroneous operations as an evaluation item, the setting operation time is a total elapsed time from a start to an end of the setting operation to a shutter button operation, the no-operation time is a noncontact time for which the user is not in contact with the GUI, in the setting operation time, and the number of erroneous operations is the number of erroneous operations that are performed in the setting operation time, the GUI is a GUI that is used in an imaging apparatus, and operation items include a stop, a shutter speed, and imaging sensitivity.

23. A non-transitory computer readable medium storing a GUI setting program that causes a computer to execute:

GUI presentation processing of presenting a GUI for operating an electronic apparatus, evaluation value acquisition processing of acquiring an evaluation value for evaluating an operational feeling of a user with respect to the presented GUI, GUI setting processing of setting to change the presented GUI to a different GUI based on the evaluation value, and transmission processing of transmitting, to the electronic apparatus, information of the different GUI as information of GUI to be next presented, wherein the GUI is a GUI that is used in an imaging apparatus, and operation items include a stop, a shutter speed, and imaging sensitivity.

\* \* \* \* \*